(12) United States Patent
Hutcheson

(10) Patent No.: US 11,584,487 B2
(45) Date of Patent: Feb. 21, 2023

(54) HYDROELECTRICITY PRODUCTION FACILITY USING CHANGES IN WATER COLUMN DENSITY TO INDUCE VERTICAL FLOW

(71) Applicant: Matt Hutcheson, Cypress, TX (US)

(72) Inventor: Matt Hutcheson, Cypress, TX (US)

( * ) Notice: Subject to any disclaimer, the term of this patent is extended or adjusted under 35 U.S.C. 154(b) by 0 days.

(21) Appl. No.: 17/650,512

(22) Filed: Feb. 9, 2022

(65) Prior Publication Data
US 2022/0250723 A1 Aug. 11, 2022

Related U.S. Application Data

(60) Provisional application No. 63/147,725, filed on Feb. 9, 2021, provisional application No. 63/147,723, filed on Feb. 9, 2021.

(51) Int. Cl.
| | |
|---|---|
| *B63B 35/44* | (2006.01) |
| *F03B 13/10* | (2006.01) |
| *B63B 21/50* | (2006.01) |
| *F03B 1/00* | (2006.01) |
| *F03B 13/14* | (2006.01) |

(52) U.S. Cl.
CPC ............. *B63B 35/44* (2013.01); *B63B 21/50* (2013.01); *F03B 1/00* (2013.01); *F03B 13/10* (2013.01); *F03B 13/142* (2013.01); *B63B 2035/4466* (2013.01)

(58) Field of Classification Search
CPC .......... Y02E 10/20; F03B 13/10; F03B 13/06; B63B 35/44; B63B 1/048
USPC .......................................................... 416/85
See application file for complete search history.

(56) References Cited

U.S. PATENT DOCUMENTS

| | | | |
|---|---|---|---|
| 2021/0088023 A1* | 3/2021 | Rohl | ........................ F03B 13/06 |
| 2021/0148327 A1* | 5/2021 | Anteau | .................... F03B 17/04 |
| 2022/0010763 A1* | 1/2022 | Von Bargen | .......... F03B 17/005 |

* cited by examiner

*Primary Examiner* — Long T Tran
*Assistant Examiner* — James J Kim
(74) *Attorney, Agent, or Firm* — Kearney, McWilliams & Davis, PLLC; William Yarbrough

(57) ABSTRACT

The present invention relates generally to facilities and systems capable of initiating and maintaining vertical flow, upward, within an extended-length water column by inducing changes in density throughout the column. Specifically, the induced (vertical) flow of water within an extended water column that is the present invention is accomplished through fluid aeration, with ambient air, which is directed toward producing ascending water flow rates sufficient to generate hydraulic pressure and hydraulic powered energy, through generated radial force in hydraulic turbines. It is another goal of this invention to utilize air infused water, derived from high-density and low depths, to create said vertical flow and induce turbine actuation through said unaltered, recyclable mediums—air and water—resulting in electrical power generation and desalination.

18 Claims, 22 Drawing Sheets

HYDROELECTRICITY PRODUCTION FACILITY USING CHANGES IN WATER COLUMN DENSITY TO INDUCE VERTICAL FLOW

FIELD OF THE INVENTION

The present invention relates generally to a process and method for inducing vertical flow, upward, within an extended-length water column by induction of changes in density throughout the volume within the column. Specifically, the induced (vertical) flow of water within an extended water column that is the present invention is accomplished through ocean water aeration, with ambient air, which is directed toward producing water flow rates sufficient to generate hydraulic pressure and hydraulic powered energy through generated radial force in a hydraulic turbine. The radial force of the turbine is then converted into electrical energy. It is another goal of this invention to utilize air infused oceanic water, at high-densities and low depths, to create said vertical flow and induce turbine actuation through said recyclable air and water.

BACKGROUND

Traditionally, power derived from water (i.e., hydroelectrical power) has been harnessed by utilizing the forces of gravity by channeling the potential energy of a static body of water flowing from a higher elevation to a lower elevation, producing kinetic energy, and in turn converting water flow to electric power. The historical method for this process is placing a water retention structure (dam) connected to a facility with an electricity generation capacity through a number of large tubes (penstocks). The combination of the reservoir water pressure and gravity forces the water downhill, from an area of high potential energy, through the penstocks, and into turbines and generators which produce electricity. Water is then released downstream.

While traditional hydroelectric production has been used for years as a clean, efficient way to produce large quantities of energy, where most of the world's largest powerplants are hydroelectric, it is not without its disadvantages and limitations.

Namely, hydroelectric power is limited to locations having higher than average flow rates with the ability to significantly change the elevation of that flow to produce energy. This limits these locations to either rugged elevation terrains (throughout the European Alps), natural restrictions that induce higher flow (Hoover Dam), or the construction of massive multibillion dollar megaprojects on large waterways (China's Three Gorges Dam, Brazil's Itaipu Dam). Large areas of coastal and flat terrain can only utilize this power with transference over long transmission distances.

Moreover, building large dams and reservoirs can have significant, and often harmful, environmental and social impacts. Throughout the world, untold square miles of fragile natural habitat, arable land, and even population centers have been permanently submerged to provide the water needed for hydroelectricity production. While these reservoirs may serve other purposes such as water supply and recreation, the fact remains that ecosystems are oftentimes negatively impacted by their installation. Compounding this is the fact these projects are often large in scale and geographical reach.

Too, adequate, consistent water supply is the fuel that drives hydroelectric power. Without it, power production can become intermittent and overall efficiency and dependability drops. It is well known that weather patterns are highly dynamic, and climate factors can vastly affect water availability anywhere and at any time. The problem itself compounds if the reservoir is strained as both a power and water supply source wherein once the water passes from the reservoir, supplies can only be replenished naturally by more water coming from upstream.

A prime example of scarce and taxed resources is Colorado River supplied Lake Mead which feeds Hoover Dam in Nevada—classified as the US's largest reservoir in terms of water capacity. This man-made potable water, agricultural water, and hydroelectricity source, straddling the Nevada-Arizona border, services some 40 million people in the western US and Mexico. Yet, over recent decades Lake Mead has become extremely stressed and now stands depleted to under 40 percent of its capacity. Low water levels are consistently taxed and further exacerbated by several concomitant factors: (1) increased population demands on an ever-decreasing supply of surface area water (indicative of generalized regional warming), (2) low snowpack runoff feeding the Colorado River, and (3) an unrelenting, prolonged drought over the entirety of its catchment basin placing downward pressure on an ever-dwindling supply which is a new and unfortunate hallmark of arid regions across the Southwest. As of January 2021, the lake sits almost 145 feet below its normal pool level with no signs of recovery. During drier seasons it has reached over 200 feet below normal pool level. Markedly, if levels sink below 1050 feet, Lake Mead will reach a critical level and Hoover Dam will no longer have the capacity to operate functional turbines due to inadequate retention and insufficient water flow.

There is the exception of a few small facilities using a process called "pumped water storage" (PWS) or "pumped-storage hydroelectricity" (PSH) wherein water is pumped from a lower elevation to a higher elevation reservoir, primarily during off-peak consumption hours, via electrically powered pumps wherein said water is then released, follows gravitational pull to turbines which create electric power. The power supplied results in a net negative in terms of power generating resources, although use of this energy storage method of power generation during high peak power consumption can result in the selling of energy in higher price brackets and obviate the use of environmentally impactful coal and nuclear power. Unfortunately, while these reservoirs may have water supply supplanted naturally, these systems are essentially only practical as part of a larger energy producing system wherein exogenous power must be introduced into a PSH system, and these systems are fundamentally designed as an adjunct to more conventional power supplies and are not designed or designated to operate in a 24-hour demand cycle.

Therefore, to summarize the insufficiencies of hydroelectricity, it is clear that several impediments exist. Logistically, and chief among a hydroelectric source's limited utility, is the geographical constraints which diminish where these sources may realistically be located. Further limiting a power sources' functionality is the strict dependence upon the regularity of natural occurrences (i.e., local weather and climate) which is clearly the most critical of all constraints. Finally, and most consequential in the long term, is the often-potentiated externalities inflicted upon populations and the natural inhabitants of the surrounding area where the very construction itself, carries a heavy ecological and societal footprint.

Inventor thus finds it incumbent upon himself to address the aforementioned infirmities in the art in terms of (1) easily distributable and scalable hydroelectric designs for all regions (but especially those otherwise incapable of acquiring clean, renewable energy), (2) environmentally conscious power procurement with a small geographical and ecological footprint and affect, and (3) utilization of a water source that is a reusable and recyclable, dependable, abundant and stable.

To accomplish this, it is first vital to recognize the four critical physical measures to creating hydroelectricity:

Physical Fundamentals of Hydroelectricity

1) Head

Head constitutes the difference in elevations of sea level and the water source providing flow and energy to the turbine structure. In basic terms, the head of the system dictates the amount of potential energy in the water that can be converted to kinetic energy and then into electric energy. To achieve a heightened head, greater pressure is exerted on the water column, in relation to the ambient sea level, causing increased flow velocities, though areas with extremely high head values often have smaller volumes of water to deliver.

2) Flow Velocity

Flow Velocity is crucial in the conversion of force (energy) of water into electrical power wherein the water must reach the turbine at a significant enough velocity to induce and maintain significant turbine rotation. Systems with high head or delivering flow through a restricted feeder (nozzle) system, tend to have greatly increased flow velocity, though they may lack sufficient flow volume.

3) Volumetric Flow Rate

Volumetric Flow Rate is the volume of water which can be delivered from the reservoir and to the blades of the turbine in a certain unit of time. The greater the volume of water flow, or conversely, the smaller the amount of time, the greater the amount of delivered kinetic energy to a turbine or turbines. Oftentimes, hydroelectric systems with extremely high-volume flow rates either suffer from low head and/or low flow velocity—a fact that is addressed herein.

4) Mass Flow Rate

Mass Flow Rate (MFR) is the true measure of deliverable power from the source (water, reservoir) to the turbines for energy generation. This considers all the above factors and adds a mass component of the energy being delivered. Pressure exerted by the head, its effect on both flow velocity and volume flow rate, and the gross mass of the water all combine to produce a power factor that dictates the energy available for conversion to electricity. Inadequacies in any of these other critical measures can lead to a lower mass flow rate and reduced power producing capacity and ability.

It is the stated objective of inventor to (1) create a method harnessing induced water flow, and that flow's characteristics, sufficient to generate and sustain the production of utility level electric power for distribution to electricity customers, (2) to create a hydroelectric system that offers widespread deployment options, scalable power production capabilities, a small geographical footprint, and a dependable/stable water supply, and (3) a means to establish these methods and systems in an environmentally and socially conscious manner as is expected of modern renewable energy installations.

SUMMARY OF INVENTION

And while objective 1 method and process of producing vertical flow in a water column is addressed above, as well as in greater detail below, objectives 2 and 3 rely heavily on the actual implementation of the 'method and process' of producing vertical flow via an aerated column of air defined by a specific volume and area of water in a riser pipe. Therefore, to address the actual production of hydroelectricity, a facility design, including individual sub-system components, must be defined and is therefore provided herewith.

Goal number two is involved directly with providing a dependable/stable water supply from essentially any body of water, of sufficient depth and volume, aerated to achieve sufficient vertical pressure and flow to actuate and rotate an energy producing turbine then returning said water back to the source.

The third goal, while arguably the most subjective, is also perhaps to most vital in that, regardless of the successful implementation of the previous two goals, if inventors cannot create hydroelectricity in an environmentally and social conscious manner, net losses will exceed net gains.

As is illustrated in FIG. 1, the traditional method of eliciting electrical power from stored water (e.g., a reservoir 115), through penstocks 120 to a turbine or turbines 125, inducing electrical power through a generator 130, to a powerhouse 140 which is then distributed via power lines 145 for consumer receipt. Once utilized, water then flows via river 105 to reenter an ecological system.

To improve upon the above prior art, as is detailed in this disclosure of the present invention, as detailed in FIGS. 2-5, a contained fluid system exists when a closed and empty pipe is lowered into a fluid body of water and opened, or if an otherwise empty pipe is lowered into a body of water, the water will enter the pipe and flow upwards until the level in the pipe equilibrates to the fluid level outside the submerged pipe. This is deemed hydrostatic pressure defined wherein equilibrium comes from the equal densities of the fluid inside and outside of the pipe, the mass of the overlying fluid, and the effects of atmospheric pressure and gravity. All these being equal in this contained system, hydrostatic pressure equilibrium is reached, and vertical flow will cease.

Equally true, fluids tend to move from an area of greater pressure or concentration to an area of less pressure or concentration thus explaining why "water flows downhill" and why petrochemical "blowouts" occur. Correspondingly, the greater the pressure and force of a fluid, the more power that can be produced in a hydroelectric station (and the stronger a potential blowout). Hence, the need exists for adequate head to accommodate a higher water pressure. When hydrostatic pressure equilibrium is achieved, head is effectively zero. Contrariwise, when the pressure within a confined space exceeds the affective head, pressure exceeds the equilibrium point, creating negative head, and advancing from the confined space, upward.

Expanding upon this theory, a riser pipe or plurality of riser pipes, may be lowered to a sufficient depth in substantially any body of water of sufficient depth and volume, whether natural or manmade, to cause a column of water to be contained within. Compressed atmospheric air is then injected into the riser pipe or pipes at a volume and rate sufficient to decrease water density of a section or volume of water within the riser pipe(s) to raise the head elevation within the pipe(s) beyond measured surface level (whether sea level or other surface elevation). Thereby, necessary pressure and flow characteristics are created to transform water's potential energy to kinetic energy of the advancing water and then into electrical energy via actuation (and pressure maintained upon) finned turbines placed in the water flow. Once the water flow has actuated the fins, caused rotation about the axis of the turbine, created rotational force and passed the turbine, it is recycled back into the sourced water body from which it was derived. The lower density and higher pressure, achieved through application of ambient air at some depth below surface depth of said pipe or pipes system, remains constant and/or is supplied intermittently at such rates and amounts adequate to support continued flow, as the accessed body of water acts as an inherently "infinite" source of aerated water.

Therefore, the present application presents a facility design with an emphasis on supplying hydroelectric energy that offers the smallest energy density and ecological footprint. key individual sub-system components will thus be represented as pieces of a greater whole wherein the resultant combination serves all three stated above goals and all work toward the same end result.

The proposed facility is defined as using a traditional spar production platform or series of platforms, semi-submersible platforms, floating platforms or otherwise fixed platform technology commonly used for offshore oil and gas exploration and production. This technology may be readily retrofitted into a floating hydroelectric power station or stations. Said facility will ideally sit atop a cluster of large diameter riser pipes extending to a sufficient depth to create the high-pressure subsea conditions necessary to induce proper flow characteristics for hydroelectric power generation. By way of the previously defined process for inciting vertical water flow using density change from injected atmospheric air, impact turbines (e.g., Pelton style turbines) will be made to rotate via hydraulic force (hydraulic pressure) created by the upward flow of water as per the designed operation. Rotational (mechanical) energy will then be transferred from the rotated shaft to electrical generators, thereby creating electrical energy. Generated electrical power may then be routed to a nearby shore, and to the purchasing utility customers, by a subsea umbilical electrical transmission network. High-pressure and high-volume centrifugal air compressors housed within the facility will provide the atmospheric air to be injected into the riser pipe water column, which may be manufactured to operate on at least a portion of said flow-supported, power generators, wherein said turbines create sufficient electrical energy to support the functionality of said compressors in operation.

The facility will be connected to the onshore electric power grid via an inbound circuit whereby the facility can draw exogenous electric power for its startup operations (ex. exciter motors for the generator units, starting up air compressors) to incite the necessary water flow to the turbines, other onboard systems as needed), until sufficient flow is reached to start electric power generation. At this time, the inbound circuit can be terminated, if desired, and the facility can draw on its own (self-generated) power generation to continue running the air compressors in addition to other onboard systems. Alternatively, said facility may have a battery storage system sufficient to power startup operations, and then recharge during operation. Too, said facility may have combination of (a) inbound circuit and (b) a battery storage system.

More specifically, the facility is made up of certain sub-system components which may be integrated, modular or a combination therefrom. Said components are defined and detailed below as to inform those having skill in the art how to make and use the present invention.

It is the stated goal of this proposed process, system and method of use to lower a "riser pipe" to a sufficient depth in a marine body of water and introduce compressed atmospheric air, which is injected into the riser pipe opening contiguous with the marine depth, at a volume adequate to decreases that area harboring said introduced air, decreasing that volume's fluid density, with respect to the nonaerated volume within the pipe, sufficient to cause the less dense volume to ascend in the pipe and artificially raise the head elevation within the pipe beyond measured sea level. Thus, necessary pressure and flow characteristics will be leveraged for creating flow and subsequent electrical energy from turbine actuation in the water flow. Once the water flow has passed the turbine and gained equilibrium with the ambient air, through release of internalized atmospheric air, water is then returned and recycled back into the ocean. Succinctly, the pressure applied by the ocean water to the bottom opening of the riser pipe system remains constant, albeit greater at increasing depth, while the decreasing density of the impregnated volume of water allows for concomitant decreased density and increased (upward) flow. Most appealing, both the water and air is unadulterated and unmolested and the ocean and air act as an inherently "infinite" source of air-induced hydraulic power.

As well, Inventor envisions a perpetual and "symbiotic" codependence of compressed, ambient air and water wherein the electrical power supplied by said turbine or turbines may be used to operate an air pump that sequesters and compresses atmospheric air, injects that compressed air into the riser pipe at an internal location (and depth) associated with an area at the distal most riser pipe opening (i.e., terminus), at an area just above said terminus or any appropriate depth for flow initiation and maintenance, and potentiates the decreased density induced vertical flow within said riser pipe.

Additionally, using a riser pipe lowered to a sufficient depth in a marine body of water together with the initiator (compressed atmospheric air) introduced into the pipe at a requisite depth to induce flow allows for uniform or targeted air injection, aerating a portion or segment of the riser pipe and into an adequate volume to decrease the fluid density within the pipe sufficiently, to artificially raise the head elevation within the pipe beyond measured sea level wherein said depth may be at some depth (1) less than the depth of the terminal pipe opening but (2) sufficient to cause decreased water density within the riser pipe, allowing denser marine water to flow into the pipe and induce vertical flow. This is important where a higher depth, than the depth of the terminal pipe opening, of compressed air insertion may nonetheless induce requisite flow (through dense marine water introduction into the terminal pipe opening moving from an area of high density to low density), while avoiding the increased power required to transport said atmospheric air the entire length of said riser pipe.

It is also within the contemplation of inventor to inject aeration at one to a plurality of locations and/or areas of a riser pipe as to facilitate and or control (increase, decrease stop and start) water flow rates taking into consideration water depth, water pressure and water temperature. To this end, it is also within inventor's contemplation to utilize various sensors to monitor depth, pressure, temperature, internal and external to the riser pipe, and flow rates within the riser pipe.

It is further within the contemplation of inventor to utilize the electrical power generated by the turbine to create a small electrical field to remove salts from seawater. This may be accomplished through electricity-assisted multi-stage flash distillation, multiple effect evaporation, freeze separation or reverse osmosis to facilitate or supplant conventional evaporation and condensation methods. This 'electrochemically mediated seawater desalination' is a membrane free system requiring small amounts of electrical currents to accomplish desalination.[1]

[1] (https://www.waterworld.com/technologies/article/16207744/new-desalination-method-uses-electrical-field-to-filter-seawater#:~:text=By%20creating%20a%20small%20electrical,from %20water%20at %20a %20microscale.)

It is therefore the present invention, design and implementation thereof which allows for (1) a means and method to cause potentiated vertical water flow through aeration-induced density changes in a water column providing characteristics sufficient to sustain the production of utility level electric power for continued aeration and flow production as well as distribution to electricity customers, (2) creation of a hydroelectric system that offers widespread, universal deployment options, scalable power production capabilities, a small geographical footprint, and a dependable/stable water supply that is (3) infinitely sustainable and environmentally and socially conscious.

The present invention recognizes and addresses the previously discussed inadequacies and long-felt needs in the art and provides a solution to those insufficiencies via its various possible embodiments and equivalents thereof. To one having skill in this art who has the benefits of this invention's disclosure, teachings, embodiments and suggestions, other purposes and advantages will be appreciated from the following detailed description and preferred embodiments, given for the purpose of disclosure, when taken in conjunction with the accompanying drawings and appended claims. The detail in these various descriptions is not limited though by the particular embodiments disclosed but covers all counterparts and alternative embodiments.

BRIEF DESCRIPTION OF THE DRAWINGS

While the novel features and method of use of the present invention are set forth in the application itself, as well as a preferred modes of use and advantages thereof, the invention itself is best understood by referencing the following detailed description when read in light of the below described drawings in view of the claims, wherein:

Figure 1:
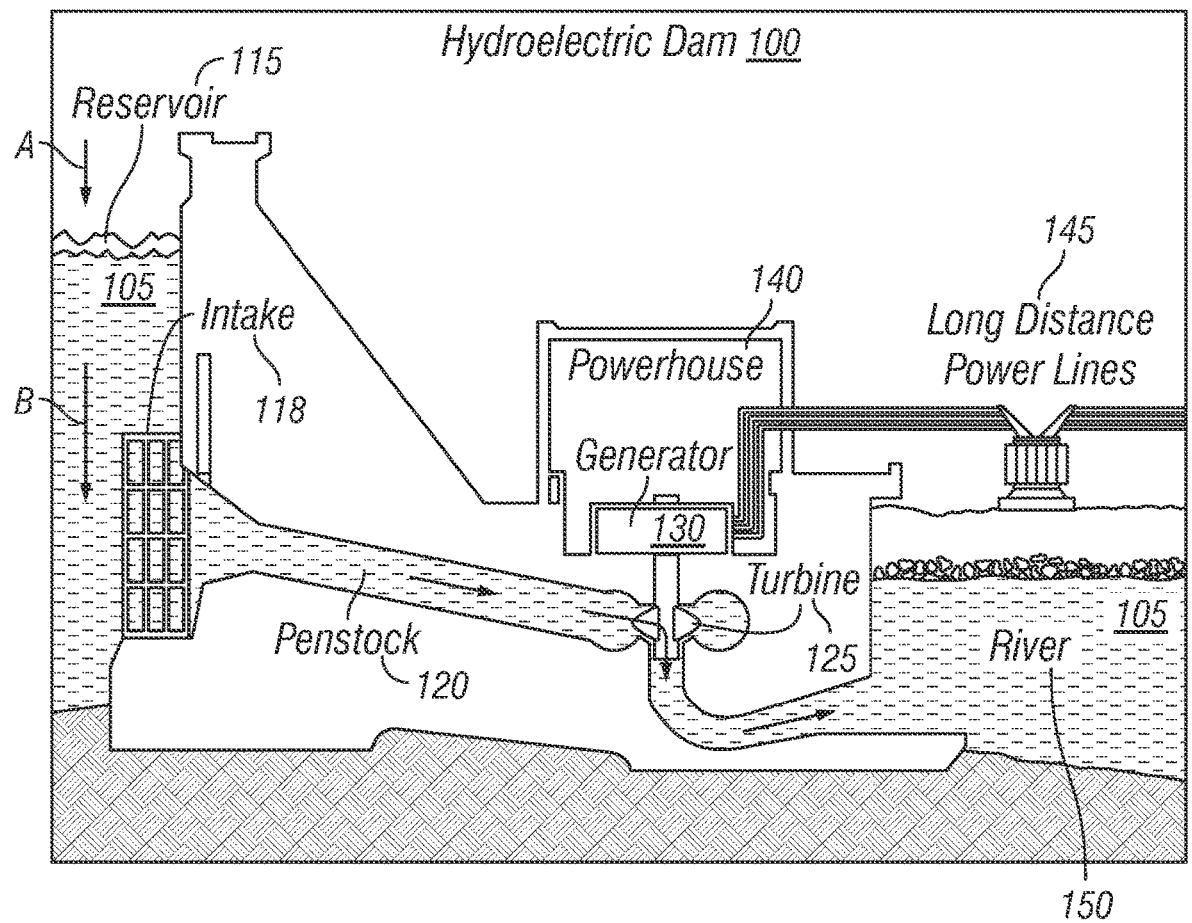
FIG. 1 depicts a traditional prior art hydroelectric dam.

And while the invention itself and method of use are amendable to various modifications and alternative configurations, specific embodiments within have been shown by way of example in the drawings and are herein described in adequate detail to teach those having skill in the art how to make and practice the same. It should, however, be understood that the above description and preferred embodiments disclosed, are not intended to limit the invention to the particular embodiment disclosed, but on the contrary, the invention disclosure is intended to cover all modifications, alternatives and equivalents falling within the spirit and scope of the invention as defined within the claim's broadest reasonable interpretation consistent with the specification.

DETAILED DESCRIPTION OF THE INVENTION

While advantages of the present invention will be readily apparent to those having skill in the art, based on the appended description, there are described certain embodiments, designs, and uses constituting the present invention and examples for illustrative purposes. And, although the following detailed description contains specific references to configurations and models, one having skill in the art will certainly appreciate that modifications, alterations, and variations are within the scope of the present invention. Accordingly, the following embodiments of the invention are set forth without any loss of generality to, and without imposing limitations upon, the claimed invention. While preferred embodiments are described in connection with the description herein, there is no intent to limit the scope to the embodiments disclosed below. On the contrary, the intent is to cover all alternatives, modifications, and equivalents.

Ultimately, necessary pressure and flow characteristics of water and air are exploited to create electrical energy from a turbine actuated by water flow, and once the water flow has passed the turbine it is recycled back into the ocean. The pressure applied by the ocean water to the riser pipe system remains constant and true to the depth, compressed air is cycled through the riser pipe and the ocean acts as an inherently "infinite" source of water and power.

Through experimentation, the four necessary fluid flow properties required for producing hydroelectric power are deemed to hold true for the present invention. That is to say, adequate (1) Head Elevation is attained in the proposed process, (2) sufficient Flow Velocity is maintained (while still maintaining adequate volumetric flow rate and mass flow rate), (3) Volume Flow Rate (VFR) is met and exceeded (besting even Volume Flow Rates attained in state of the art, world class traditional hydroelectric power stations), and (4) Mass Flow Rate (MFR), even with greatly reduced density of the fluid in the riser pipe, is still attainable to deliver a surplus of energy to the turbine through the mass of the water flow.

Thus, it can be concluded that using the parameters in the model executed herewith that the proposed process physically meets the needs of delivering the power necessary to generate utility grade hydroelectricity through rotation of a turbine or turbines. When compared to known high-performance hydroelectric power stations utilizing similar technologies and components, the proposed process performs (or in some cases outperforms) traditional hydroelectric power station parameters and harbors innovations and advancements far in excess of those disclosed by the prior art.

The traditional method, as depicted in prior art FIG. 1, includes a Hydroelectric Dam 100, wherein the Reservoir 115 displays an elevation higher than that of both the Penstock 120 and the River 150. This is important in that water existing in the reservoir 115 will naturally seek a lower elevation (e.g., the River 150), through the intake 118 and into and through the penstock 120, past the blades of the turbine 125 and into the river 105, as a result of both gravitational pull B and ambient air pressure A. The turning of the blades of turbine 125 converts the kinetic energy of the water 105 into electrical energy through a power Generator 130 contained in a Powerhouse 140 (wherein a transformer, not shown, is generally utilized) which conveys electricity via a long-distance power line or lines 145 to the ultimate user.

Figure 2:
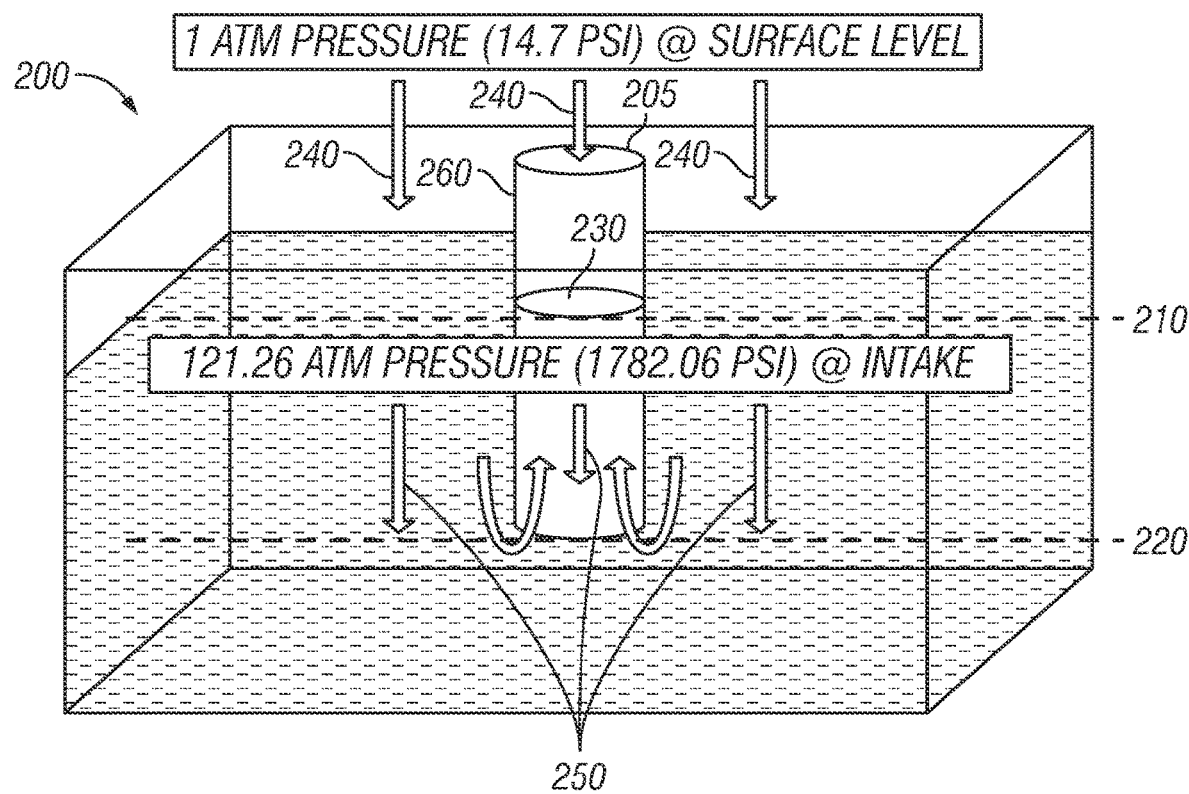
FIG. 2 illustrates a submerged riser pipe in a body of water with corresponding pressures.

FIG. 2 is an example and representation of the present invention 200 whereby surface level of a fluid 210 (e.g., water) within a cylindrical pipe 205 is shown as level zero feet (above sea level or surface level) or, typically designated "sea level", and level or depth of fluid intake 220 is negative 4000 (−4000) feet or 4000 feet below surface zero. Of note, this depth is strictly representational wherein greater or lesser depths may be designated in operation wherein adjustments in overall length (height) of the riser pipe may be necessitated by the depth of a body of water, force of compressed air required and the like. Surface pressure 210 as illustrated is 1 ATM (14.7 PSI) and pressure at intake 220 is 121.26 ATM (1782.06 PSI). At rest, head 230 is equal to surface level 210 wherein ambient atmospheric air 240 and gravitational pull 250 maintain a consistent downward pressure on the volume of water contained with a riser pipe 260.

Figure 3:
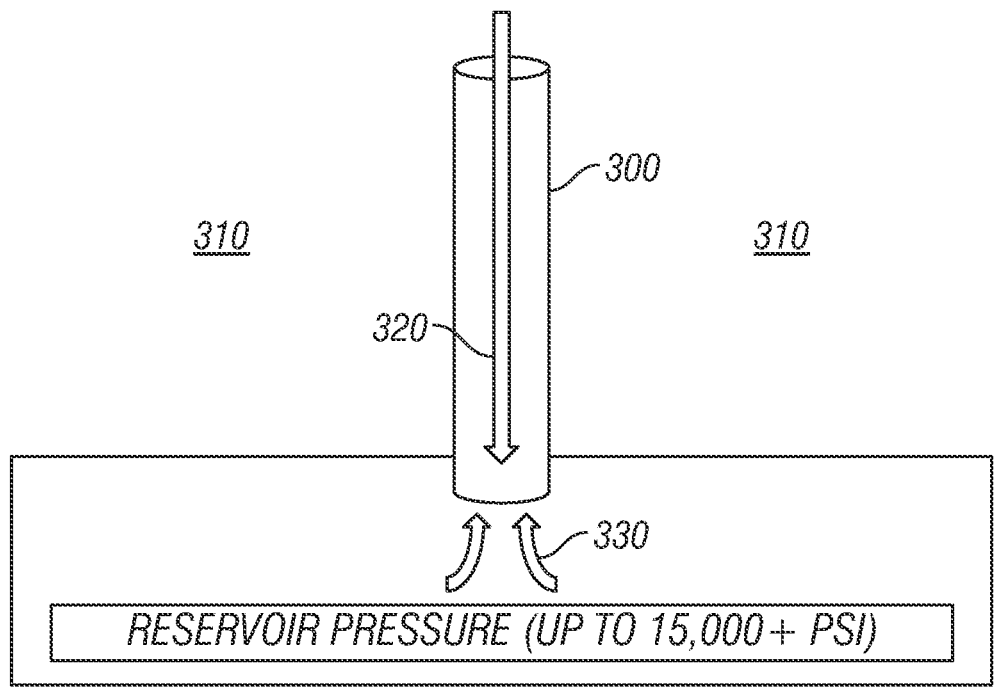
FIG. 3 shows a representational maintained well bore.

To demonstrate the proposed process of induced vertical fluid flow 550 through directed density changes, dynamics from the petroleum drilling industry can be used as a means of providing a relatable example. Controlling well pressure by using weighted drilling mud, and, where pressure imbalance occurs well blowout results. Prior art FIG. 3 is representative of a traditional wellbore 300 drilled into a pressurized fluid containing reservoir or formation 310. When the downward pressure 320 of the injected drilling mud (not shown) mass is equal to the upward pressure 330 applied by the reservoir fluids 310, hydrostatic pressure equilibrium is reached. But as is the case in FIG. 4, when the pressurized fluids 430 are greater than the inserted drilling mud (not shown), fluids from the formation 410 move from an area of high-pressure X to low pressure Y and thereby enter the wellbore 300 causing blowout 450. It is this high-density drilling fluid (carefully measured by a mud engineer) which prevents a pressure imbalance resulting in petrochemicals travelling up and out of the wellbore during blowout 450.

In the case of a well blowout 450, the reservoir or formation 310 pressure exceeds the downward pressure 320 applied by the drilling mud and gravity and reservoir or formation 310 fluid is then able to enter the wellbore and travel to the surface. The key to maintaining a controlled wellbore 300, like that in FIG. 3, versus an out-of-control blowout like that in FIG. 4 can be explained by simple physical factors—downward pressure and the density of the drilling fluid. If the pressure and mud density are sufficient, then the reservoir fluid is not forced out of the wellbore 300.

If the pressure and density are insufficient, upward flow of pressurized fluid moves beyond a "surface elevation" and thus exceeds hydrostatic pressure equality.

Taking the information garnered from the example of an uncontrolled petroleum wellbore and applying it to a hydroelectric system allows the power producing turbines to reside generally at an elevation higher than the hydrostatic pressure equilibrium level. Again, this must be accomplished with a net energy gain to produce commercially viable levels of electrical power to a power grid.

Figure 4:
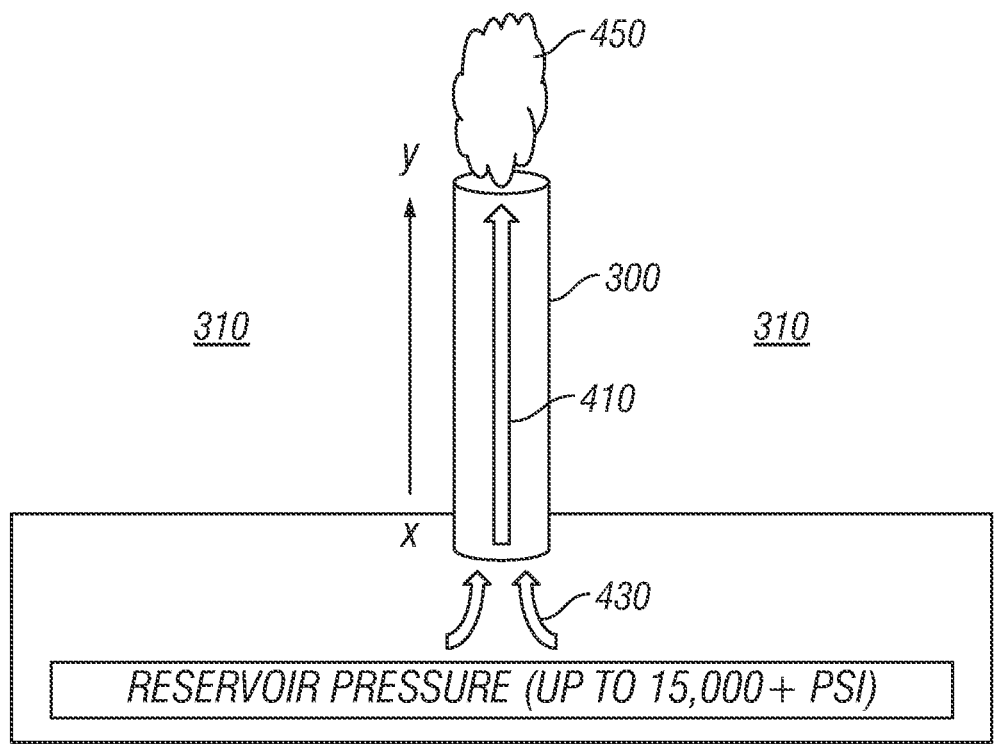
FIG. 4 is a wellbore experiencing "blowout".
Figure 5:
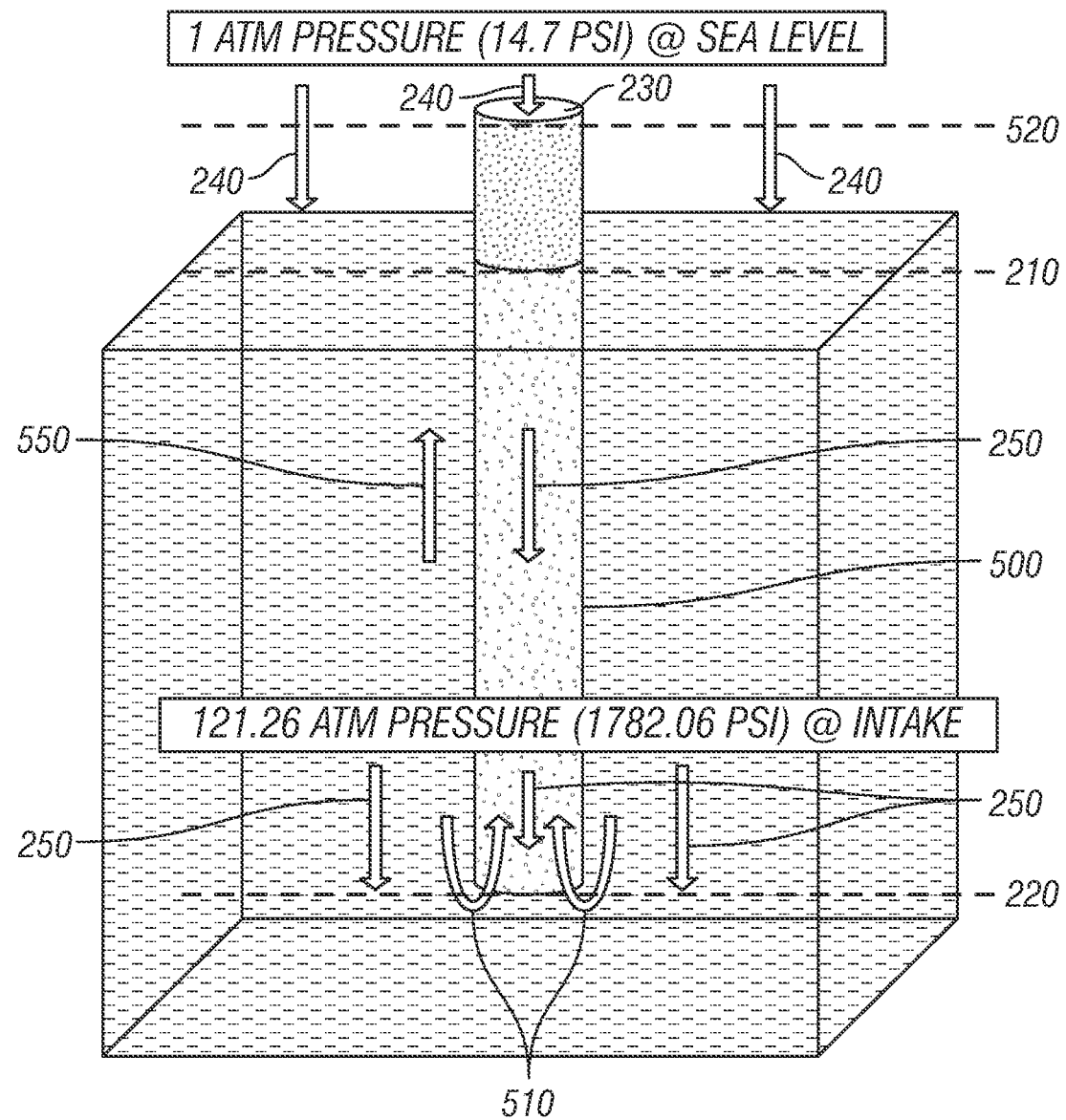
FIG. 5 depicts a representation of the present invention producing upward, vertical flow.

Using the above example, in FIG. 5, a single exemplary riser pipe 500, or collection or plurality of riser pipes, generally commensurate with the cylindrical pipe 205 in FIG. 2 and pipe of a wellbore 300 depicted in FIGS. 3 and 4, is/are lowered to a sufficient depth (depicted representationally as 4000 feet) in any body of water of sufficient depth and volume, whether natural or manmade, wherein compressed atmospheric air 510 is injected at intake 220 into the riser pipe 500, or series of pipes, and an area of water is aerated by injected air 510 at a volume and rate sufficient to decrease fluid density of a section or volume of water within the riser pipe(s) sufficient to artificially raise the head elevation 230 within the pipe(s) beyond measured surface level (whether sea level or other surface elevation) 520. The induced flow thus exceeds both gravitational pull 250 and ambient atmospheric pressure 240 to produce a negative head 230. Thus, necessary pressure and flow characteristics are created sufficient to generate turbine-produced electrical energy from the harnessed kinetic energy of upwardly advancing water placed in the path of a turbine wherein once the water flow has been initiated and passes the blades of a turbine or turbines (not shown), rotational forces are generated, electrical currents are produced from said rotational forces and water is then recycled back into the body of from which it was sourced. The air pressure 240 applied by the accessed water at the bottom 220 opening of the riser pipe or pipes 500 remains constant and/or intermittently adequate to support continued flow, as the accessed body of water acts as an inherently "infinite" source of the invention's most critical asset—water.

It is to be understood, though, that aeration, or injection of gas at designated "points" into a riser pipe (or series of riser pipes) may be introduced at intake 220 via one to a plurality of air injectors, with sufficient volume and pressure, to induce upward, vertical flow 550. It is also within the contemplation of inventor to provide aeration into the riser pipe at some depth above intake 220 and a depth less than 4000 feet (or an appropriate designated depth) to further control upward, vertical flow 550 wherein said aeration "points" may be used to initiate flow, facilitate flow, expedite flow or, in certain cases, retard flow.

It is, as well, in the contemplation of inventor to shorten or lengthen said riser pipe 500 as the environment (i.e., body of water) necessitates. Correspondingly, said point or points of insertion may be shortened or lengthened as to accommodate said pipe shortening or lengthening. For example, should a shorter riser pipe be required, wherein sufficient density lessening through aeration cannot be practically employed over the given depth, multiple inputs may be required at the intake portion of exemplary riser pipe 500 and/or insertion points may exist at multiple points along the length of riser pipe 500 to facilitate or expedite said upward, vertical flow. In this case the pressure of compressed air may need to be adjusted to accommodate the depth of a point or points of insertion delivery within said column of water. Therefore, at deeper depths (>4000 feet below the surface), riser pipe length and insertion points may be adjusted as to accommodate and/or overcome both resistive forces on the compressed air wherein, once flow is initiated, less aeration vis-à-vis a lesser density volume may be used to maintain upward, vertical flow. Moreover, various lengths and diameters of pipes, numerous compressed air insertion points, variable compressed air pressures and volumes, gaseous fluid other than air, or a combination thereof, may be used simultaneously, contemporaneously, in series or in parallel as to better regulate vertical flow 550 (ex. volume and rate) received at a turbine or turbines.

Alternatively, should flow exceed a certain threshold or rate, compressed air may be used to decrease the flow received at the turbine as to increase efficiency or protect vital components of the turbine or turbines and/or the ratio of air to water (i.e., amount of air injected in to said water) may be adjusted to regulate flow.

What is more turbines need not be identical wherein any number of turbines (e.g., impulse, reaction, radial flow, axial flow, mixed flow, low to high flow, etc.) may be utilized, temporally or alternating, at a single site (or multiple sites) of upward, vertical flow 550 as to provide versatility, robustness, redundancy, efficiency, convertibility, backups, or a combination thereof.

A number of physical processes come into play to create the vertical fluid flow 550 effect represented in FIG. 5. The primary driving force behind the concept is a differential in fluid density created inside a riser pipe or series of exemplary riser pipes 500 in relation to outside a riser pipe or pipes 500. For example, seawater has an average density of approximately 1027.3 kg/m³, ranging from 1020 kg/m³ to 1029 kg/m³, depending on temperature and salt content and since liquids are essentially incompressible, at near surface depths, this does not change appreciably, within the context of the present invention, with moderate variances in depth or pressure. Salinity may also have an effect on density of seawater, yet, at temperatures salinity of 35 g/kg and 1 atm pressure, the density of seawater is approximately 1023 kg/m³-3.5% salinity being an accepted average. Moving from briny water, through saline and brackish water, to fresh water, salt content can vary from less than 0.05% to between 26 to 28% (equating to a density of 1050 kg/m³ or higher. Atmospheric air compressed to 2,000 psi has a density of approximately 170.0 kg/m³. The fundamental formula for combined density of fluids is as follows:

$$\rho_{CF} = (\rho_{F1} * \%_{F1}) + (\rho_{F2} * \%_{F2})$$

Clearly, the density of the combined fluid (air plus water) is equal to the density of each fluid individually multiplied by its percentage composition of the combination, both gaseous fluid and liquid fluid, represented above as $\rho_{CF}$. In FIG. 5, if it is assumed, for example, that atmospheric air is being injected into an individual riser pipe 500 under 2,000 psi of pressure in a quantity that constitutes 65% of the combined fluid composition, the combined fluid will have a density of 470.06 kg/m³:

$$770.11 \frac{kg}{m^3} = \left(1027.3 \frac{kg}{m^3} * 0.70\right) + \left(170.0 \frac{kg}{m^3} * 0.30\right)$$

Therefore, the reduction in fluid density within an individual riser pipe 500 is a direct result of an increase in the pressure differential in relation to an external liquid fluid (i.e., salt, or fresh water infused with gaseous air) wherein internal aqueous fluid contains a measurable percentage of ambient air (gaseous fluid) above that of the fluid surrounding said riser pipe 500. This may be duplicated in a plurality of riser pipes in combination or groups existing at various depths and locations. Fluids inherently flow from a high-pressure environment to a low-pressure environment, seeking equilibrium. In the case of the air infused fluid in the riser pipe 500, this means upward flow of air infused water toward the surface and into the open atmosphere, thus raising the head level 520 of the water column above ambient water level 210 as shown in FIG. 5. So now, by altering the water column density, fluid will flow continuously from a high pressure (from the base of riser 220, constant pressure applied from external ambient water) to medium pressure (pressure decreasing as depth decreases inside riser pipe or pipes), to low (atmospheric) pressure (whereby fluid can continue past ambient water surface level due to described flow). Of note, movement may be initiated at any depth sufficient to create adequate upward flow but may also be facilitated and controlled via aeration at any depth above the point of initiation of aeration.

The increase in head elevation is a function of altering opposing pressure forces in the riser pipe or pipes water column. The pressure caused by the external aqueous fluid (e.g., seawater or fresh water) works in the same way as the high-pressure reservoir fluid from FIG. 4 ultimately leading to well blowout 450. Formation fluids can be seen in FIG. 4 seeking out a lower pressure environment superiorly in the lower density drilling fluid, continued migration along a reduced pressure gradient path until reaching the surface and beyond. The key difference between the FIG. 4 reservoir pressure and FIG. 5 aqueous fluid pressure, however, is that the fluid pressure in FIG. 4 never abates, unless actively terminated, and therein lies the ability for this process to provide an essentially infinite supply of water flow for a hydroelectric system so long as the injected atmospheric air 510 supply is maintained. If the air supply 510 is removed, then the external fluid and the internal riser pipe fluid will once again be of equal density and pressure and reach hydrostatic pressure equilibrium at surface level 210. Proportionately, adjusting the degree of aeration, through regulation of density via modification is in flow rate and velocity, allows the user to increase, decrease or maintain a defined, efficient or optimal rate of flow.

Now that it has been shown that seawater can be physically made to flow vertically (vertical fluid flow 550) in an exemplary pipe (or pipes) 500, beyond hydrostatic pressure equilibrium at surface level 210 via the use of injected atmospheric air 510, the question remains whether sufficient flow can be generated to adequately rotate a utility grade commercial turbine. To ensure that adequate energy is available to deliver requisite power, the flow itself must meet the four physical requirements discussed earlier: (1) head, (2) flow velocity, (3) volume flow rate, and (4) mass flow rate.

In a closed fluid system, such as the one shown in FIG. 2, if an empty pipe is lowered into a fluid body and opened, the fluid will enter the pipe and flow upwards until the level in the pipe equilibrates to the fluid level outside the tube. This is deemed hydrostatic pressure. The equilibrium comes from the equal densities of the fluid inside and outside of the pipe, the mass of the overlying fluid, and the effects of atmospheric pressure and gravity. All these being equal in this closed system, hydrostatic pressure equilibrium is reached, and vertical flow will cease. Similarly, fluids tend to move from an area of greater pressure to an area of less pressure explaining why "water flows downhill" and the greater the pressure of that water flow, the more power that can be produced in a hydroelectric station. Hence, the need for adequate head to accommodate the higher water pressure. When hydrostatic pressure equilibrium is achieved, head is effectively zero.

The simple matter of why hydroelectric stations cannot be positioned higher than their reservoir is that the water cannot simply "flow uphill". It can never flow to a point higher than its present level unless acted on by another force or influence and is constrained by hydrostatic pressure. Flowing vertically against the forces of gravity and pressure would be the equivalent of "negative head". Historically there have been many ways of transporting water uphill, but none net an energy gain. They require the addition of external mechanical energy to the system, either by pumping, screw action, or otherwise.

To demonstrate the proposed process of vertical fluid flow through induced density changes, common scenarios from the petroleum drilling industry can be used—controlling well pressure by using weighted drilling mud, and, where pressure imbalance occurs, well blowout. FIG. 3 is representative of a traditional wellbore being drilled into a pressurized fluid reservoir. When the downward pressure of the drilling mud mass is equal to the upward pressure applied by the reservoir fluids then hydrostatic pressure equilibrium is reached. But when the pressurized fluids are greater than drilling mud fluids from the formation fluids attempt to enter the wellbore. It is the high-density drilling fluid (carefully measured by a mud engineer) which prevents a pressure imbalance resulting in petrochemicals blowing up and out of the wellbore.

In the case of a well blowout, the reservoir pressure exceeds the downward pressure applied by the drilling fluid and gravity and reservoir fluid is able to make it to the surface and out of the wellbore. The key to maintaining a controlled wellbore like that in FIG. 3 versus an out of control blowout like that in FIG. 4 can be reduced down to one defining physical factor—the density of the drilling fluid. If the density is sufficient, then the reservoir fluid does not force itself out of the wellbore. If the density is insufficient, upward flow of pressurized fluid moves beyond a "surface elevation" and thus exceeds hydrostatic pressure equality.

Taking the information garnered from the example of an uncontrolled petroleum wellbore, and applying it to a hydroelectric system allows the power producing turbines to reside at a higher elevation than both the reservoir level and hydrostatic pressure equilibrium level. Again, this has to be accomplished with a net energy gain to produce commercial levels of electrical power.

Using above example, a riser pipe is lowered to a sufficient depth in a marine body of water and compressed atmospheric air is injected and aerated into the riser pipe at a volume that decreases the fluid density of a section or volume of water within the riser pipe sufficient to artificially raise the head elevation within the pipe beyond measured sea level. Thus, necessary pressure and flow characteristics will be made available for creating electrical energy from a turbine placed in the water flow once the water flow has passed the turbine it is recycled back into the ocean. The pressure applied by the ocean water to the bottom opening of the riser pipe system remains constant, as the ocean acts as an inherently "infinite" source of water.

A number of physical processes come into play to create the vertical flow effect represented in FIG. 5. The primary driving force behind the concept is a differential in fluid density created inside a riser pipe in relation to outside the riser pipe. Seawater has an average density of approximately 1027.3 kg/m³, and since liquids are essentially incompressible, this does not change considerably with depth or pressure. Atmospheric air compressed to 2,000 psi has a density of approximately 170.0 kg/m³. The fundamental formula for combined density of fluids is as follows:

$$\rho_{CF}=(\rho_{F1}*\%_{F1})+(\rho_{F2}*\%_{F2})$$

Whereby the density of the combined fluid is equal to the density of each fluid multiplied by its percentage composition of the combination. In FIG. 5, if it is assumed that atmospheric air is being injected into the riser pipe under 2,000 psi of pressure in a quantity that constitutes 30% of the combined fluid composition. The combined fluid will have a density of 770.11 kg/m³:

$$770.11\frac{kg}{m^3}=\left(1027.3\frac{kg}{m^3}*0.70\right)+\left(170.0\frac{kg}{m^3}*0.30\right)$$

Therefore, the reduction in fluid density within the riser pipe is a direct result of an increase in the pressure differential in relation to the external seawater. Fluids inherently flow from a high-pressure environment to a low-pressure environment, seeking equilibrium. In the case of the fluid in the riser pipe, this means upward flow upward and into the open atmosphere, thus raising the head level of the water column above sea level as shown in FIG. 5. So now, by altering the water column density, fluid will flow continuously from a high pressure (from the base of riser, constant pressure applied from external seawater) to medium pressure (pressure decreases as depth decreases inside riser pipe), to low (atmospheric) pressure (whereby fluid can continue past sea level due to flow).

The increase in head elevation is a function of altering opposing pressure forces on the riser pipe water column. The pressure caused by the external seawater works in the same way as the high-pressure reservoir fluid from FIG. 4 that led to the well blowout. Formation fluids sought out a lower pressure environment in the lower density drilling fluid, and then continued migrating along a reduced pressure gradient until reaching the surface and further. The difference between the FIG. 4 reservoir pressure and FIG. 5 seawater pressure, however, is that the seawater pressure never abates, and therein lies the ability for this process to provide an essentially infinite supply of water flow for a hydroelectric system so long as the injected atmospheric air supply is maintained. If the air supply is removed, then the seawater and riser pipe water will once again be of equal density and reach hydrostatic pressure equilibrium at sea level.

Now that it has been shown that seawater can be physically made to flow vertically in a pipe beyond hydrostatic pressure equilibrium at sea level via the use of injected atmospheric air, the question remains whether sufficient flow can be generated to adequately rotate a utility grade turbine. To ensure that enough energy is available to deliver adequate power, the flow has to meet the four physical requirements discussed earlier: (1) head, (2) flow velocity, (3) volume flow rate, and (4) mass flow rate.

1) Head (Head Level)

When fluid is in a state of hydrostatic pressure equilibrium, Head 230 level is zero (as illustrated in FIG. 2). In this process, the point of equilibrium is surface level 210. However, with a change in water column density within a riser pipe 500, in relation to the external pressure forces of ambient fluid, the Head 230 changes to an elevation above surface level (e.g., above zero) at level 520.

To calculate the pressure at the base elevation of the riser pipe in FIG. 5 (here 4,000' below surface level) 220, pressure equals the fluid density, times depth, times the gravity constant. This function requires pressure measure in Pascals and depth units in meters:

$$P = \rho * d * 9.81 \frac{m}{s^2}$$

If depth is converted from 4,000 feet to meters, the depth is 1,219.2 meters. The density of seawater at this depth is 1027.3 kg/m$^3$, so the pressure at this depth (again, units are in Pascals) calculates as follows:

$$12,286,869.22 \text{ Pascals} = 1027.3 \frac{\text{kg}}{m^3} * 1219.2 \text{ } m * 9.81 \frac{m}{s^2}$$

This in turn calculates to 1,782.06 psi at 1,219.2 meters of seawater depth at depth 220. Now if the riser pipe (aerated) fluid density is substituted for the external fluid density:

$$622,023.08 \text{ Pascals} = 470.06 \frac{\text{kg}}{m^3} * 1219.2 * 9.81 \frac{m}{s^2}$$

This pressure value calculates to 815.41 psi at 1,219.2 meters of riser pipe fluid depth, a difference of 966.65 psi between the two systems. This pressure differential is what induces the flow of aerated fluid within an individual riser pipe 500, as fluids will migrate from a higher-pressure environment to a lower pressure environment seeking equilibrium. With this information Head elevation may be calculated that is created by the density reduction in the riser column. This process produces upward vertical flow 550 where the force of gravity is inverse to the force of flow. Thus, a net Head must be calculated whereby the difference between the created head elevation and sea level is treated as a positive Head elevation (i.e., above a base surface level).

The upward pressure in the riser pipe is calculated as 12,286,869.22 Pascals (the upward pressure exerted by the external fluid system at the base opening of the pipe), and the downward pressure is calculated as 5,622,023.08 Pascals (the pressure exerted downward by the mass of fluid in the riser pipe). This net pressure differential is 6,664,846.14 Pascals at surface level (P). Given the density of the fluid in the riser column is 470.06 kg/m$^3$ ($\rho$), the new Head elevation (H) can be calculated as follows:

$$H = P \div \left( \rho * 9.81 \frac{m}{s^2} \right)$$

$$1,445.3 \text{ } m = 6,664,846.14 \text{ Pascals} \div \left( 470.06 \frac{\text{kg}}{m^3} * 9.81 \frac{m}{s^2} \right)$$

The new Head elevation in the system is now 1,445.35 meters (4,742 feet). Historically, optimal Head for this type of hydroelectric system has been determined to range from 200 meters to 1,800 meters (higher or lower elevation not necessarily being "better" wherein upward pressure and force relies upon other flow factors such as flow velocity, flow rate and mass flow rate), so the result of the provided model proves adequate Head elevation can be obtained from the current provided method.

2) Flow Velocity

Relying on the above calculations, solving for the new head elevation, information about Flow Velocity can be garnered and adjustments to the process determined. Using elements of the Darcy-Weisbach Equation, many elements related to Flow Velocity can be determined. To ensure adequate volume and mass flow rates, the fluid in the riser pipe system must exhibit an adequate velocity to deliver Flow Velocity rates per a set period of time, usually units per second/minute/hour. To calculate the Flow Velocity a riser pipe 2.44 meters (8 feet) in diameter will be used wherein penstock tubes on traditional hydroelectric projects are typically at least this size. Again, total depth of the present system will be 1,219.2 meters.

The first step in the calculation is to determine friction loss which is a measure of head elevation lost due to frictional forces over the length of a flow conduit (i.e., an individual riser pipe) determined as a function of loss of head (H) divided by the length (L) of the conduit. Friction loss (S) is calculated using the below formula:

$$S = \Delta H \div L$$

In this example, the net head is calculated to be 1,445.35 meters. This, subtracted from the total depth head of 1,219.2 meters, renders a loss of head equal to 346.22 meters. Divided by the riser pipe length of 1,219.2 meters, the friction loss (S) equals 0.1855:

$$0.1855 = (1,445.35 \text{ m} - 1,219.2 \text{ m}) \div 1,219.2 \text{ m}$$

Now, to continue deriving the Flow Velocity, the friction loss is divided by a factor known as the Darcy Friction Factor which is that quotient divided again by the diameter of the conduit (in meters). The square root of this value is then taken to yield the Flow Velocity. The Darcy Friction Factor is derived from a number of flow characteristics related to turbulence, but for the purposes of this model a pre-calculated value of 0.023576 will be used. Using 2.44 meters (8 feet) as the diameter of the riser pipe, the Flow Velocity calculates to 1.80 meters per second as follows:

$$V = \sqrt{\frac{(S \div 0.023576)}{D}}$$

$$1.80 \frac{m}{s} = \sqrt{\frac{(0.1855 \div 0.023576)}{2.44 \text{ } m}}$$

This Flow Velocity is known as "Average Flow Velocity" which is a measure of the average flow velocity across the entire length of a conduit. It does not consider variances of velocity within the system, but for the purposes of modeling it is suitable. Traditionally, most high efficiency hydroelectric systems, such as this model, require much higher flow velocities (in excess of 150 m/s for some turbine styles in large facilities). However, using some basic fluid flow principles about volume flow rate and the law of conservation the new velocity can be determined. Volume flow rate (Q) is calculated using the Flow Velocity (V) and the cross-section area of the conduit (A), which is calculated as follows:

$$Q = AV$$

Calculating volume flow rate now facilitates a more efficient Flow Velocity calculation. The cross-section area of the 2.44 meter conduit is 4.67 m², and the calculated Flow Velocity is 1.80 m/s. This renders a volume flow rate of 8.406 m³/s:

$$8.406 \frac{m^3}{s} = 4.67 \ m^2 \times 1.80 \frac{m}{s}$$

Due to the law of conservation of energy, the volume flow rate must remain the same, so if the area changes or velocity changes, the same volume flow rate is maintained. If the conduit diameter is reduced to 1.22 meters (4.0 feet), the velocity will increase to maintain the same volume flow rate. The new velocity can be computed using the volume flow rate (Q) formula again, but rearranging the terms to solve for Flow Velocity (V):

$$V = \frac{Q}{A}$$

$$47.19 \frac{m}{s} = \frac{8.406 \frac{m^3}{s}}{1.17 \ m^2}$$

The Flow Velocity is increased by four times with the reduction of conduit diameter to 7.19 m/s. Of course, the smaller the diameter of the conduit becomes the faster the achievable Flow Velocity. But in order to power the hydroelectric system, the mass flow rate (discussed below) must be maintained as to deliver sufficient kinetic energy to the turbine for actuation and maintained rotational velocity. Sufficient flow to maintain adequate turbine spin though is still required to be much faster than the initial actuation force to maintain spin of the turbine to efficiently produce electrical energy. The typical solution to attaining a final 'high' Flow Velocity, while still maintaining mass flow rate, is to divide the total flow into smaller diameter nozzles at the point of contact within the turbine. By utilizing this divided fluid, flow is fractionated into multiple faster streams while still delivering the full mass flow rate. Representationally, five 0.13 m (5 inch) nozzles are employed wherein the cross-sectional area of each nozzle is 0.0127 m². Therefore, the volumetric flow rate is divided by five and equally distributed between the five nozzles. This results in a volumetric flow rate of 1.6812 m³/s per nozzle. The nozzle outlet Flow Velocity is thus calculated:

$$V = \frac{Q}{A}$$

$$132.38 \frac{m}{s} = \frac{1.6812 \frac{m^3}{s}}{0.0127 \ m^2}$$

As discussed previously, most high-performance hydroelectric systems require a Flow Velocity of 150 m/s or more. By sizing the nozzles to 0.13 m (5 inches), that goal has been reached. With such a high volumetric flow rate, very subtle decreases to the nozzle diameter size yields large gains in Flow Velocity. Modern turbine feeding nozzles are usually adjustable by several inches or more to yield the desired or peak Flow Velocity.

Therefore, adequate Flow Velocity is attainable and maintainable in the proposed process while still maintaining adequate volumetric flow rate and mass flow rate.

3) Volume Flow Rate

Volume Flow Rate is the volume of fluid that passes through a system in a given amount of time. While Head is important for determining the potential energy available for delivery, and flow velocity dictates the rate at which that potential energy is converted into kinetic energy for delivery to the turbine, the Volume Flow Rate is the measure of how much energy is actually available to be transferred. In a hydroelectric system, water can be delivered at high speed and high pressure, but if there is insufficient (flow) energy to turn the turbine then no energy is transferred to the turbine and no electrical power is generated.

To reiterate the calculation of the Volume Flow Rate (Q) from above, Q is equal to the cross-sectional area of the conduit (A) times the flow velocity (V). Using the 2.44 m diameter riser pipe and 1.80 m/s calculated flow velocity, the Volume Flow Rate (Q) is calculated as follows:

$$Q = AV$$

$$8.406 \frac{m^3}{s} = 4.67 \ m^2 \times 1.80 \frac{m}{s}$$

This in turn gives the riser pipe system a Volume Flow Rate throughput of 8.406 m³/s. The Bieudron Hydroelectric Power Station in Switzerland, which boasts world records for both highest head and most powerful Pelton style turbine, passes approximately 25.0 m³/s to each of its three 420 MW turbines, so the present system can equate, approximate or, in some cases, exceed traditional hydroelectric systems. Also, according to the law of conservation, even if the size of the conduit is reduced, the Volume Flow Rate must remain the same. An increase in velocity will occur to facilitate the change.

Volume Flow Rate Conclusion: The proposed system approximates, meets, and can even exceed the Volume Flow Rate needs of a traditional hydroelectric power station.

4) Mass Flow Rate

The final physical requirement that must exist to effectively power a hydroelectric power system is Mass Flow Rate (MFR). Achieving adequate MFR is perhaps the most imperative key feature as far as determining the raw amount of power that can be transferred from the water to the turbines for the production of electricity. Power, by definition, is an amount of energy transferred in a unit of time. Since the measure of volume flow rate is in seconds, mass flow rates are as well—the primary difference being the matter unit is kilograms instead of cubic meters.

Most traditional hydroelectric power stations operate using fresh water, which has an average density of around 1,000 kg/m³. The present system can use essentially any fluid (ex. seawater having an average density of 1027.3 kg/m³). Since the postulated riser pipe or pipes' water column is aerated, the density driving the turbine, using the earlier calculations and the same model, is 470.06 kg/m³. The aerated water, due to its lesser density, delivers much less energy per unit than unaerated fresh or sea water. Yet, compensating with ample volume flow rate and flow velocity, this aerated volume of water can offset the difference in aerated verses non-aerated water by generating enough Mass Flow Rate to achieve the same energy as denser fluids. Mass Flow Rate is measured in units of kilograms per second. To calculate this measure, the values of volume flow rate (Q) and density (ρ) are used in the following formula:

$$MFR = Q \times \rho$$

The volume flow rate has been calculated as 8.406 m³/s, and the density calculated as 470.06 kg/m³. Thus, the Mass Flow Rate (MFR) for this system is 3,951.32 kg/s:

$$3951.32 \frac{kg}{s} = 8.406 \frac{m^3}{s} \times 470.06 \frac{kg}{m^3}$$

The Mass Flow Rate at the powerful Bieudron Hydroelectric Power Station mentioned above is 25,000 kg/s (25 m3/s volume flow rate, 1,000 kg/m3 density), but the proposed system, while not generating this MFR, the present invention is still capable of producing adequate mass flow rate to drive utility grade hydroelectric equipment and supply appreciable amounts of hydroelectric power.

Figure 6:
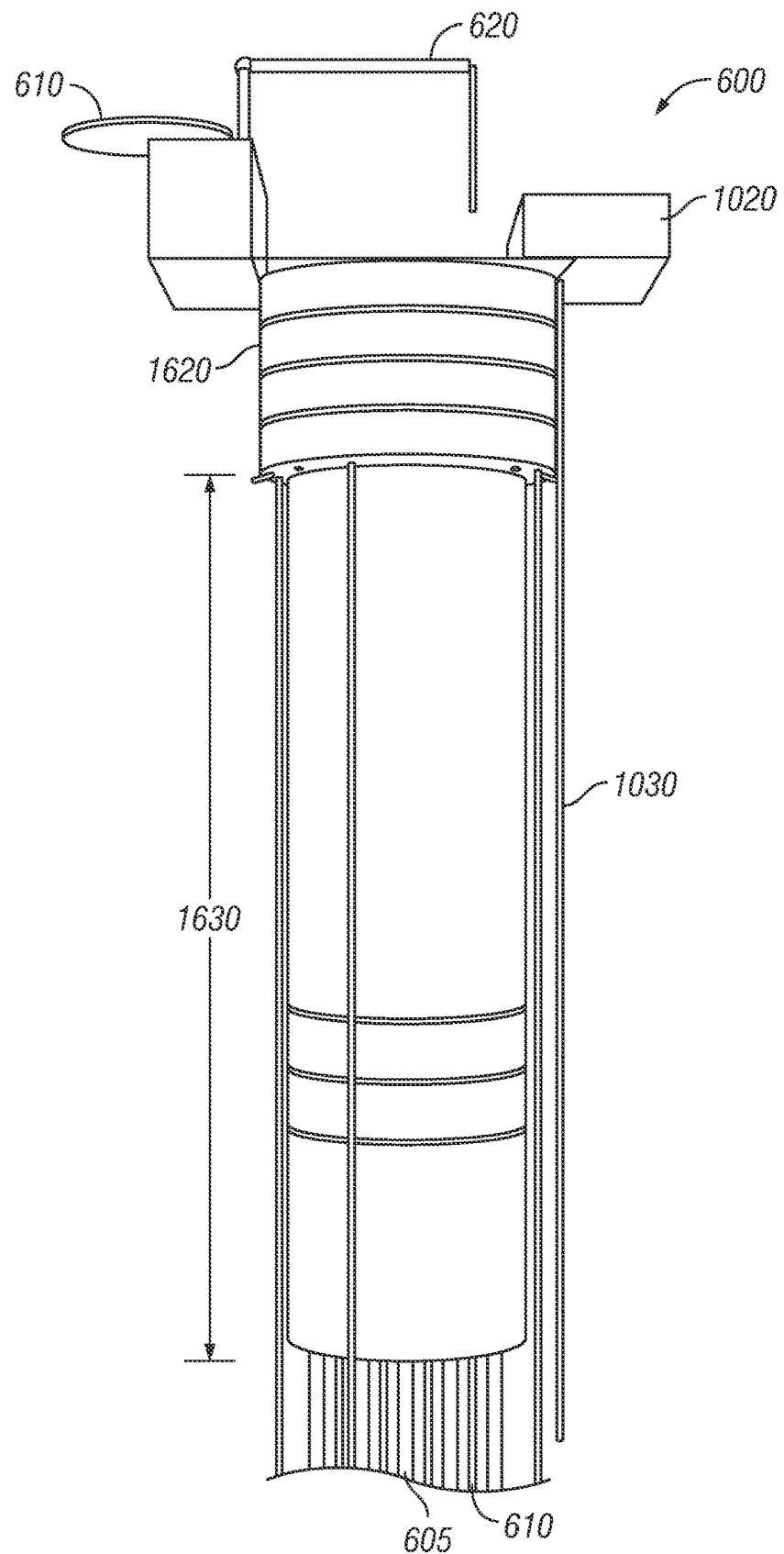
FIG. 6 shows a spar hull platform with integrated hydroelectric facility.

In terms of actual production of efficient hydroelectric energy, the present invention uses a spar platform 600 in FIG. 6, or semi-submersible platform, technology commonly used for offshore oil and gas exploration and production, transposing this technology into a floating hydroelectric power station. Said facility will sit atop a cluster of large diameter riser pipes 605 (ex. cylindrical pipe 205) that extend to a sufficient depth to create the high-pressure subsea conditions necessary to induce proper flow characteristics for hydroelectric power generation.

Figure 7:
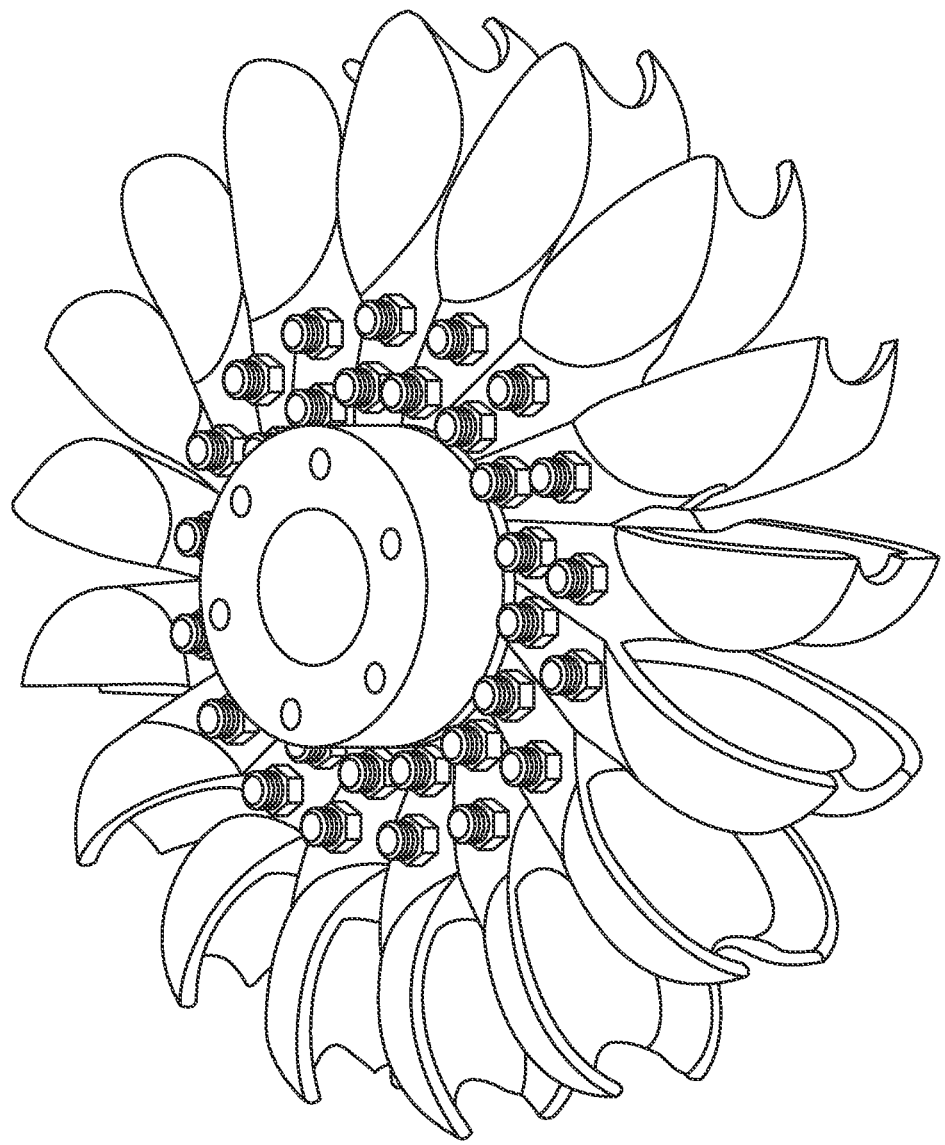
FIG. 7 illustrates a customary utility-sized Pelton turbine.

By way of the previously defined process specification for inciting vertical water flow using density change from injected atmospheric air (See specifically FIGS. 2-5), carried by air pipes 610 of a generally smaller diameter, Pelton style turbines (see FIG. 7) will be actuated and will maintain a radial rotation by the flow as long as necessary pressure is applied to the turbine blades as per their designed operation. This has been historically achieved with impulse-type turbines (e.g., Pelton turbines) due to its ergonomic construction, low maintenance, and efficiency in achieving high hydraulic head at relatively low flow rates.

Figure 8:
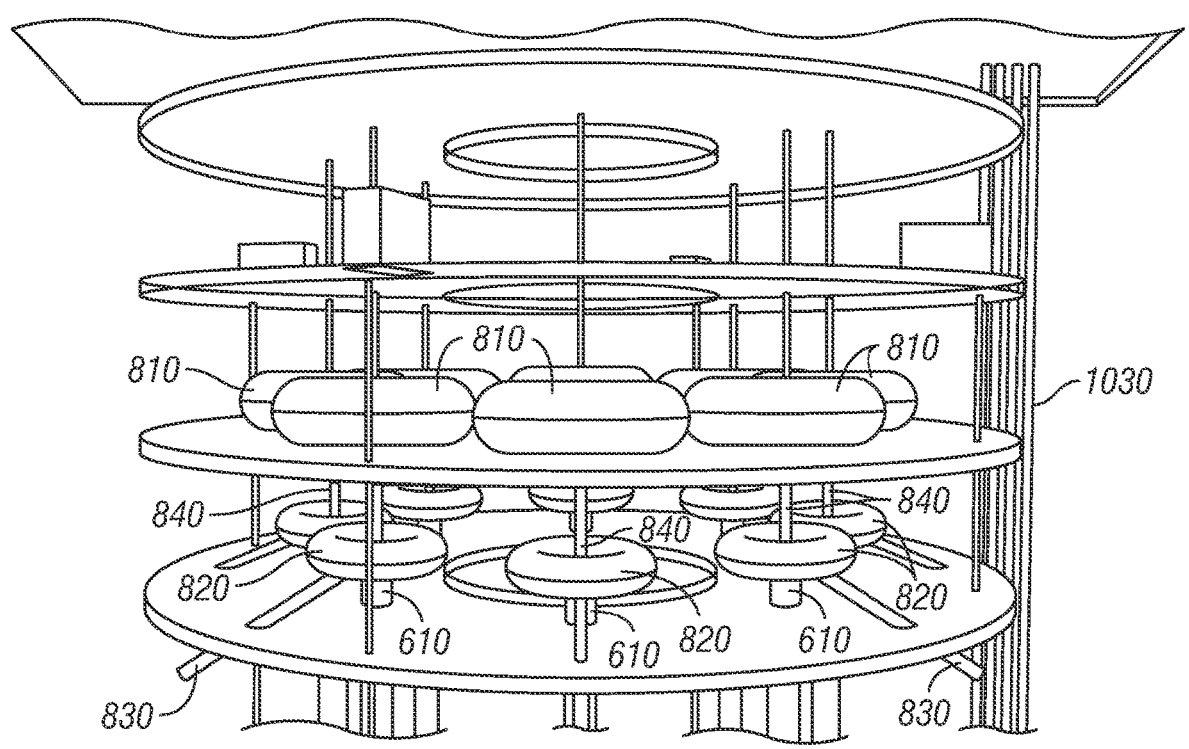
FIG. 8 depicts a cutaway view of turbine and turbine decking.

As depicted in FIG. 8, in a simplified illustration, hydroelectric turbines 820 are horizontally mounted on the lower deck while electrical generators 810 occupy the upper deck wherein riser pipes 610 feed into hydroelectric turbines 820 from below, drains 830 to the sides and returns water, via drains 830, to the surrounding body of water. Hydroelectric turbines 820 are linked to superior residing electrical generators 810 by shafts 840.

Figure 9:
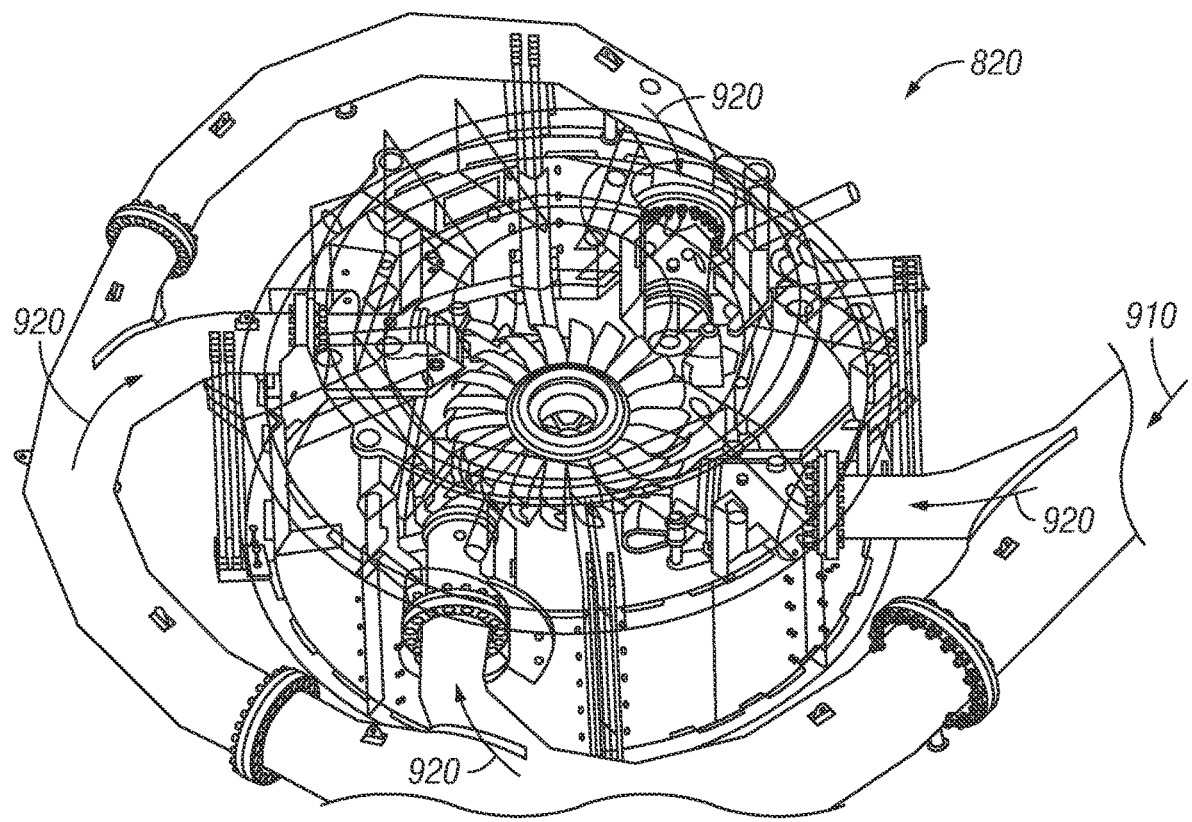
FIG. 9 is a detailed schematic of a Pelton turbine enclosure.

As depicted in FIG. 9, rotational energy is then shaft-transferred to electrical generators 810, turning the kinetic energy of primary water flow 910 into secondary water flows 920 thus creating pressure-induced radial force that is then converted into electrical power. This power is subsequently routed to shore via the power grid and to the purchasing utility customer.

Figure 10:
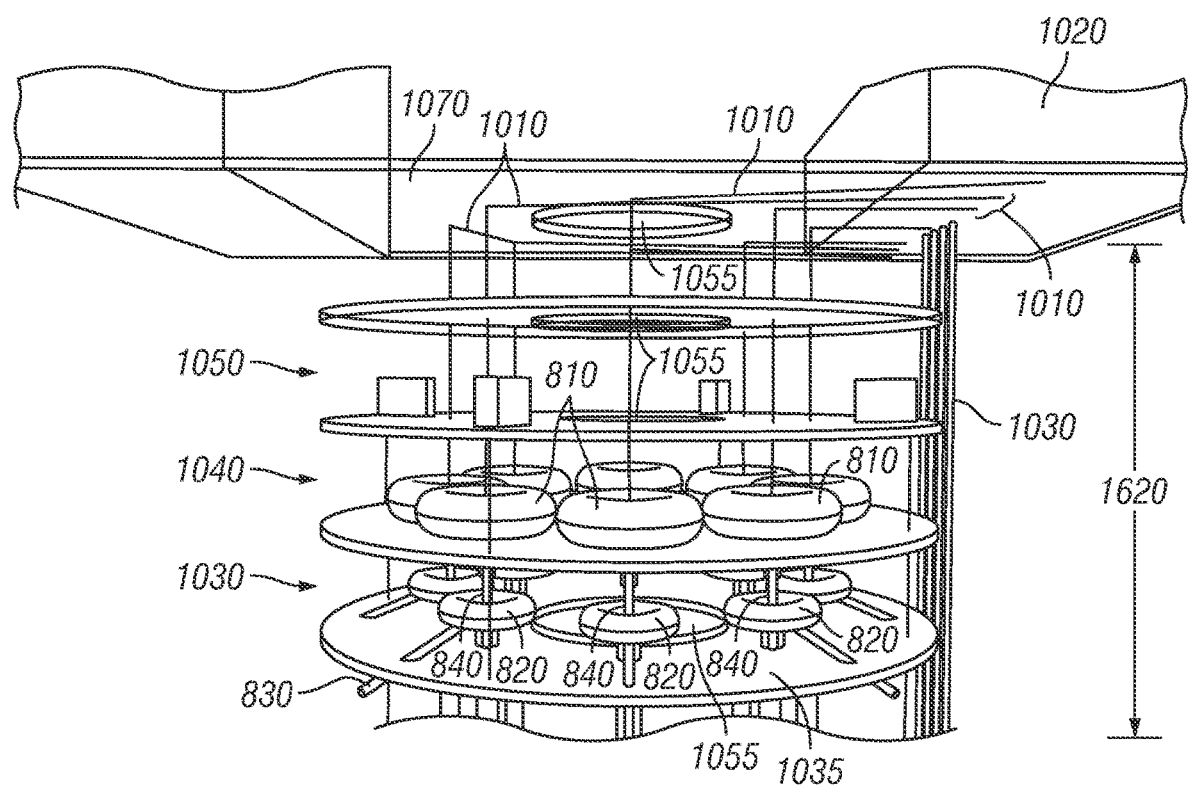
FIG. 10 shows a cutaway view of a generator deck

FIG. 10 depicts electrical generators 810 atop hydroelectric turbines 820 below wherein each electrical generators 810 is paired, through a driveshaft 840, to a turbine on the deck below. The electrical generators 810 transmit power via power circuitry 1010 feeding up into a powerhouse 1020 on the upper deck. Electric tieback cables 1030 then transmit power to the shore for ultimate consumer utilization.

Figure 11:
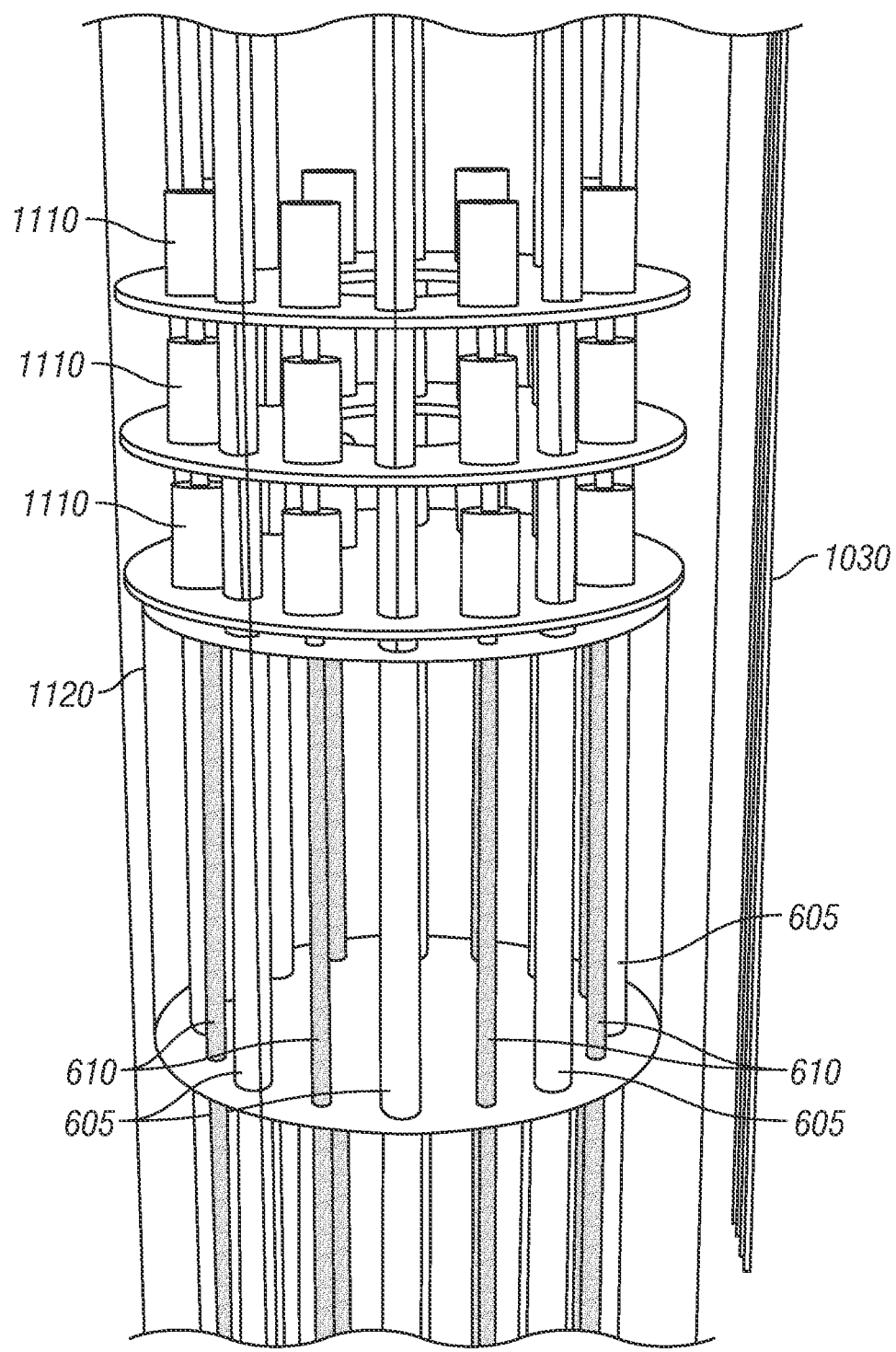
FIG. 11 illustrates a cutaway view compressor decks
Figure 12:
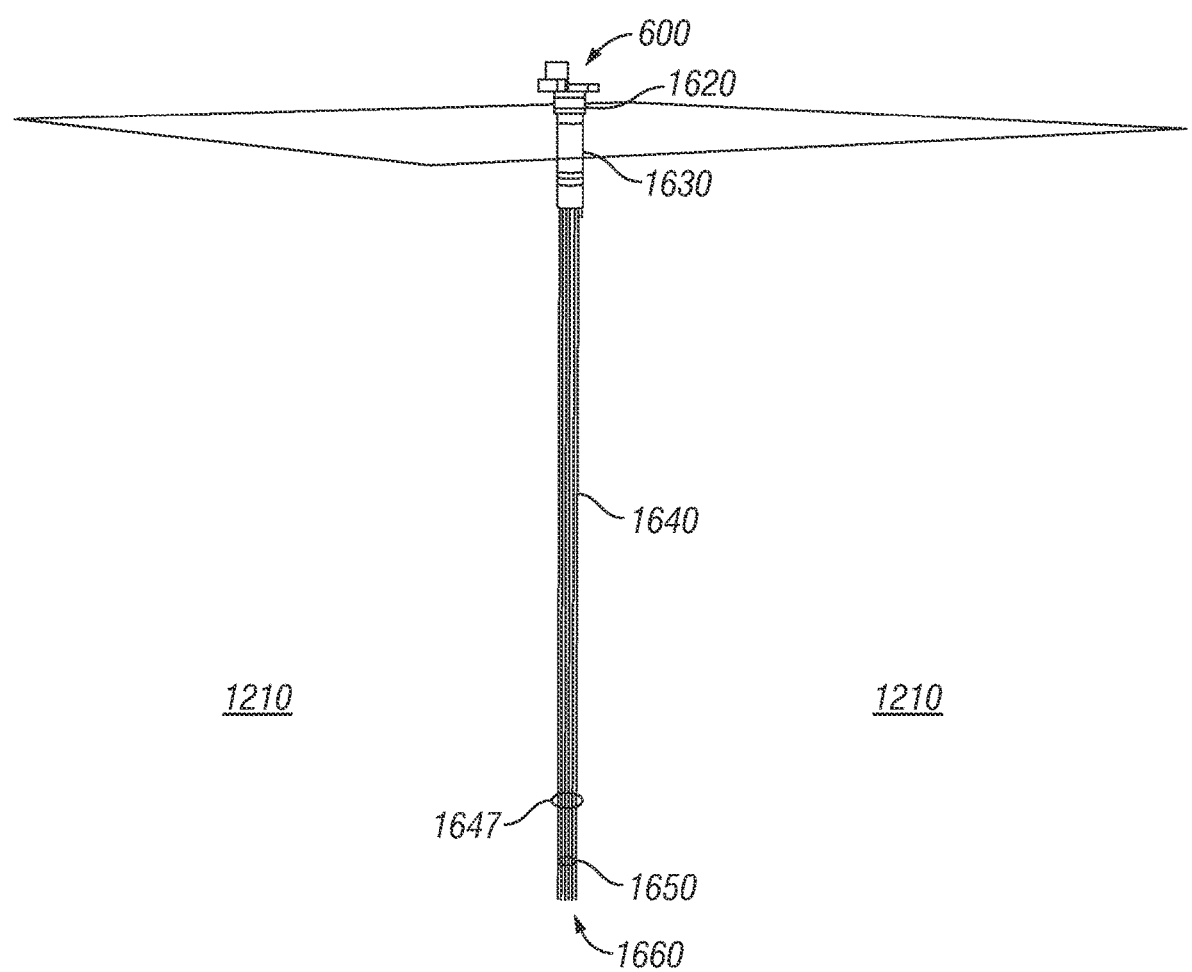
FIG. 12 is the spar platform of FIG. 6 with integrated hydroelectric riser pipe system.

FIG. 11 illustrates air compressors 1110 (e.g., industrial process sized centrifugal air compressors) utilized by the facility to deliver the large volumes of air necessary to aerate the fluid column in the riser pipe system 1647 (see FIG. 12). While delivering high volumes of air at lower pressures is not in and of itself complicated, it takes an extremely high grade of compressor to deliver these volumes into a very high-pressure environment which requires a complex collection of high-pressure piping and valve systems to control the flow level to the different riser pipes. Equally an aeration system for releasing the air flow into the riser pipes will be designed to blend the fluids most effectively to homogenize water and air content to a maximal integration. This will help mitigate collection of large air pockets or "bubbles" that could cause uneven flow at the nozzle ends, uniform turbine operation and reduce the turbine efficiency. Also, shown are air compressors 1110 and connected compressed air piping 610 interspersed among riser pipes 605 through a lower variable ballast tank 1120 and to the base of riser pipes 605.

Generated direct current (DC) power in this process is transferred by a subsea umbilical electrical transmission (via tieback cables 1030) network terminating in an onshore substation that converts this direct current (DC) electricity back into alternating current (AC) electricity for release to the grid and end user consumption. High-pressure and high-volume centrifugal air compressors 1110 housed within the facility will provide the atmospheric air to be injected into the riser pipe water column to both initiate and maintain the rotational force required for electrical power generation.

The facility itself may be connected to the onshore electric power grid via inbound circuit whereby it can draw electric power for its startup operations (exciter motors for the generator units, starting up air compressors 1110 to incite the necessary water flow to the turbines, other onboard systems as needed, until sufficient flow is reached to start electric power generation. At this time, the inbound circuit can be terminated if desired, and the facility can draw on its own power generation to continue running the air compressors 1110 and other onboard systems (up to and including desalination systems).

Hull Structure

As illustrated in FIG. 6, "in-use" oil and gas exploration and production type spar platform 600 technology (i.e., fixed or "floating", moored platforms) allows for quicker deployment of assets as many facilities around the world exist that incorporate this type of floating structure. The "Spar" 600 itself is used to describe these platforms where a "spar" 600 is a nautical term for an extended pole or mask designed to hold a ship's sails and rigging. Spar platforms 600 themselves are extremely stable, scalable, and adaptable. Large spar hulls can have diameters well over one hundred and twenty feet and reach depths around four hundred feet below the surface. These create a large amount of buoyancy, and expansive topsides structures can be placed atop of these hulls, on the order of ten thousand or more tons. Large ballast tanks 1120 (FIG. 11) are located near the base to stabilize the structure in moving seas and an extensive mooring structure anchors the hull firmly to the seabed while still allowing adequate motion to prevent damage.

As seen in FIG. 6, many configurations of topside structure can be affixed to a spar platform 600 hull. Per this configuration, depicted are the control and crew support structures with attached helipad 610 and crane 620. Electrical powerhouse 1020 generates electrical power which is converted to DC power and subsequently submitted to shore via tieback cables 1030. The top of the riser pipe complex can be seen running the length of the base.

Spar platforms 600 also offer a great deal of safety as well. Since they are free floating and balanced with ballast tanks 1120, if the mooring tethers 1645 are somehow compromised, the structure will simply float and keep itself righted until it can be retrieved and repaired. Also, the interiors are designed to prevent sinking in case of a hull breach and leakage using buoyancy tanks and variable water ballast that can be 'pumped out' to create more buoyancy. The low cross-section and stabilizing structures under the surface mitigate the effects of ocean currents, and because these structures are free floating in deep water environments, such structures cannot easily be damaged by seismic activity or resultant tsunamis. Spar platforms 600 have been deployed in harsh weather environments around the world for decades (The North Sea (harsh sea conditions and storms), Gulf of Mexico (hurricanes), and Asia (typhoons)) without any incidences of harmful failure due to conditions.

An alternative to a spar platform would be a semi-submersible platform structure. These work in much the same way but are configured with four legs and more expansive top deck to allow for larger area supporting operators and equipment. Semi-submersibles are tethered in much the same way as spar platforms and offer many of the same advantages as a spar technology. However, since one goal of this facility specification is to make the footprint of the facility as compact as possible, a spar is more conducive to meeting this goal. Also, the cost of materials and maintenance to construct and maintain a spar can be significantly less than a semi-submersible.

A further alternative would be the use of a fixed platform of various styles. This type of structure is firmly anchored to the floor of a body of water as to prevent movement in rough conditions.

Pelton Turbines

Hydroelectric power stations use a variety of turbine types based on the conditions of the water flow but inventor, based on the advantages of impulse-type turbines (ex., Pelton turbines of FIG. 7), has selected for use in the present invention an integration with most common type of turbine is the Francis turbine (See FIG. 9) which excels in conditions with lower head, lower pressure, and lower velocity, but with very high-volume flow rates. Large power stations such as Three Gorges in China, Hoover Dam and Grand Coulee in the United States, and Itaipu in Brazil all utilize banks of giant Francis turbines. Other less common turbine types include Kaplan, propeller-type, and crossflow.

Pelton turbines (See Prior Art in FIG. 7) are selected for the present invention because Pelton turbines offer the best performance in high head, high pressure, high velocity water flows, but do not require large volume flow rates. In keeping with the reasonable dimensions of the present design, a Pelton turbine system has been recognized as requiring smaller riser pipes under higher pressure and velocity as opposed to previously stated turbine types. In order to provide greater control flow and output, multiple adjustable nozzles are presently utilized in a loop system to deliver water to multiple Pelton surfaces simultaneously. A shaft 840, and perhaps a gearbox will connect the turbines to the generators and the propulsion of the blades of the turbine via applied force will induce rotational forces necessary to generate electrical (AC) power. The AC power is then converted to DC power for transmission and then back to Ac power for consumer use.

Power Generators

As detailed in FIGS. 8 and 10, large hydroelectric station sized electric power generators are utilized to produce the utility level output of electricity required from a facility of this size and magnitude. Power grids throughout the world operate on different frequencies (typically 50 or 60 hertz). The rotation speed of the generators must be a certain rate to output electricity at the correct frequency. Also, adjusting the number of poles (magnets that interact with the coil) can affect the level of output as well. Pelton turbine driven generators have an approximate maximum output of 350 MW. However, new generation units installed at the Bieudron Hydroelectric Station in Switzerland have a rated output over 420 MW due to the extremely high head and water velocities made available to these units.

Air Compressors

Industrial process-sized centrifugal air compressors 1110 (see FIG. 11) will be utilized by the facility to deliver the large volumes of air necessary to aerate the fluid column in the present riser pipe system 1647. While delivering high volumes of air at lower pressures is easily done, it takes an extremely high grade of compressor 1110 to deliver these volumes into a very high-pressure, high depth environment at or near the base of the riser pipe.

Riser Pipe System

As depicted in FIG. 12, to access huge volumes of pressurized fluid (i.e., seawater or freshwater) needed to power the facility, a series of large diameter riser pipes 605 (or alternatively, a network of smaller riser pipes 605) will descend thousands of feet from the base of the spar hull 1630 into the water body or water source 1210. Heavy grade flexible steel, or alternative materials, is used to construct these pipe sections to withstand the harsh forces at play in the deep-water environment. The oil and gas industry has a long history of deploying pipe projects in thousands of feet of water, and this knowledge should translate into deploying these large riser pipes 605.

Figure 13:
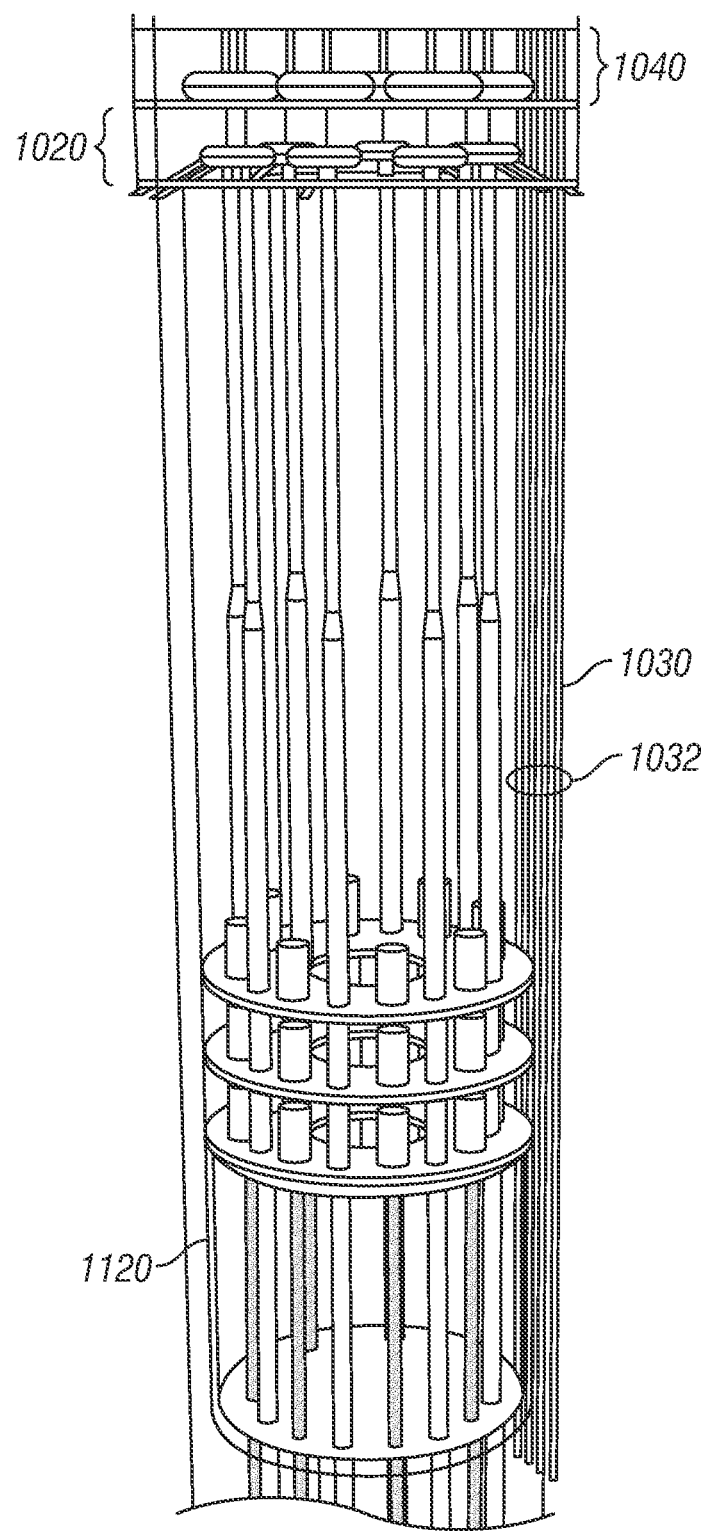
FIG. 13 depicts an interior view riser pipe structure.
Figure 14:
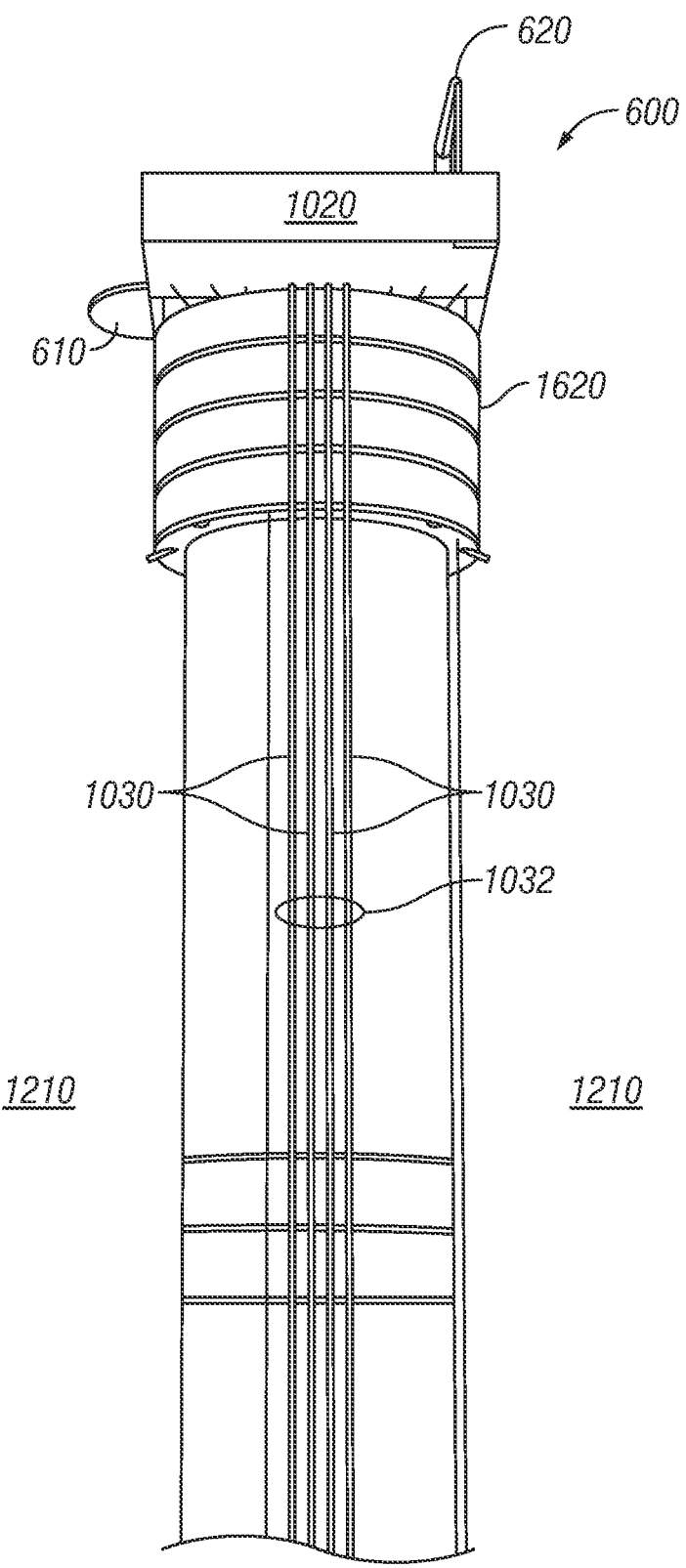
FIG. 14 shows a spar platform atop a riser pipe system including tiebacks.
Figure 15:
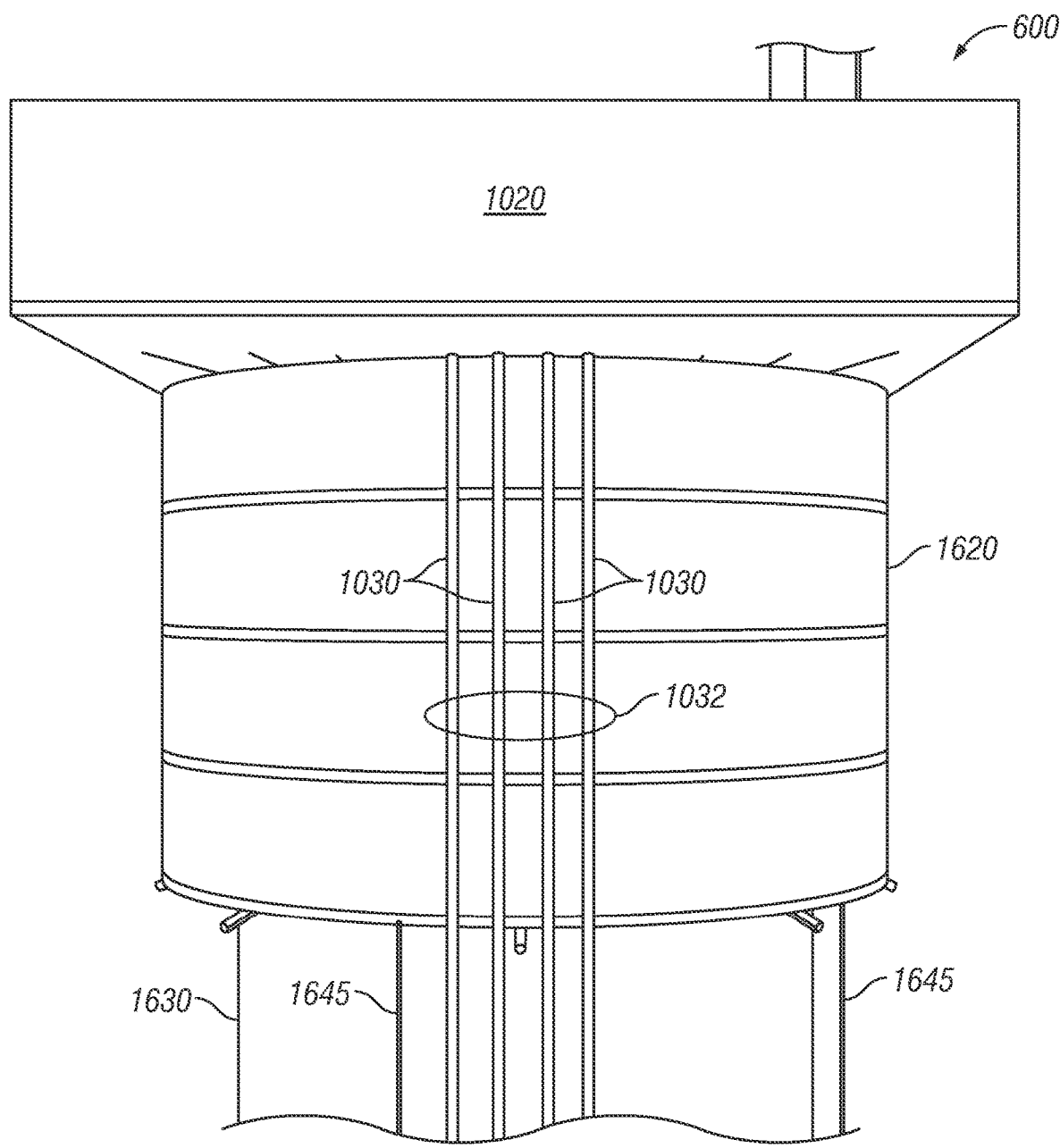
FIG. 15 is an expanded view of FIG. 14.

FIG. 13 provides an interior and expanded view of the spar platform 600 and FIGS. 14 and 15 provides an exterior view of FIG. 12 wherein FIG. 15 is a detailed view of FIG. 14.

Figure 16:
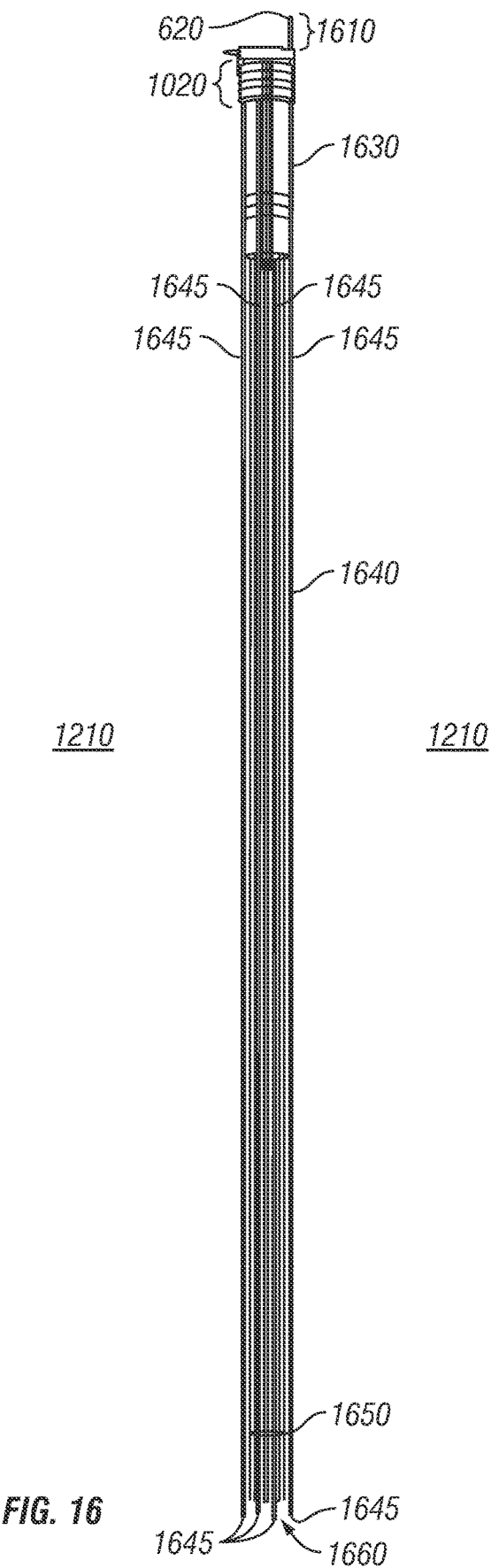
FIG. 16 is a detailed view of FIG. 12.
Figure 17:
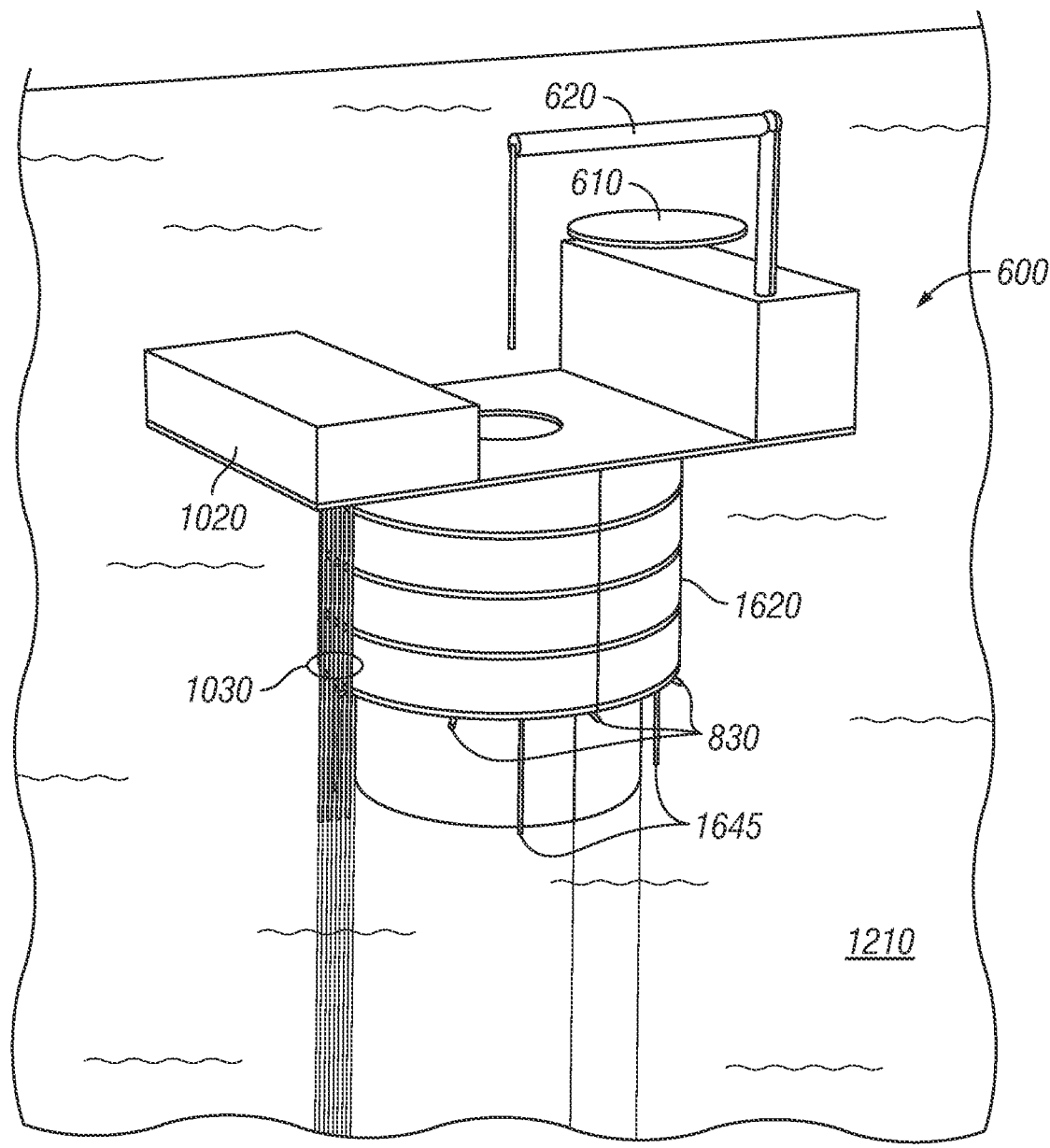
FIG. 17 is a representation of upper deck facilities including helicopter pad and crane.

FIG. 16 represents the required depth and the extended and extendable length and depth spar platform 600 and associated riser pipes 605 capable of reaching. The spar platform 600 is seen at the top of the image and reaching well over the length of a 360-foot football filed, vertically, or approximately four hundred feet tall. The riser pipe system 1647 (see FIG. 12) that is the present system extends to a depth of approximately 3,500' in the present model but may be shortened or extend further as system requirements and topography dictate.

Figure 19:
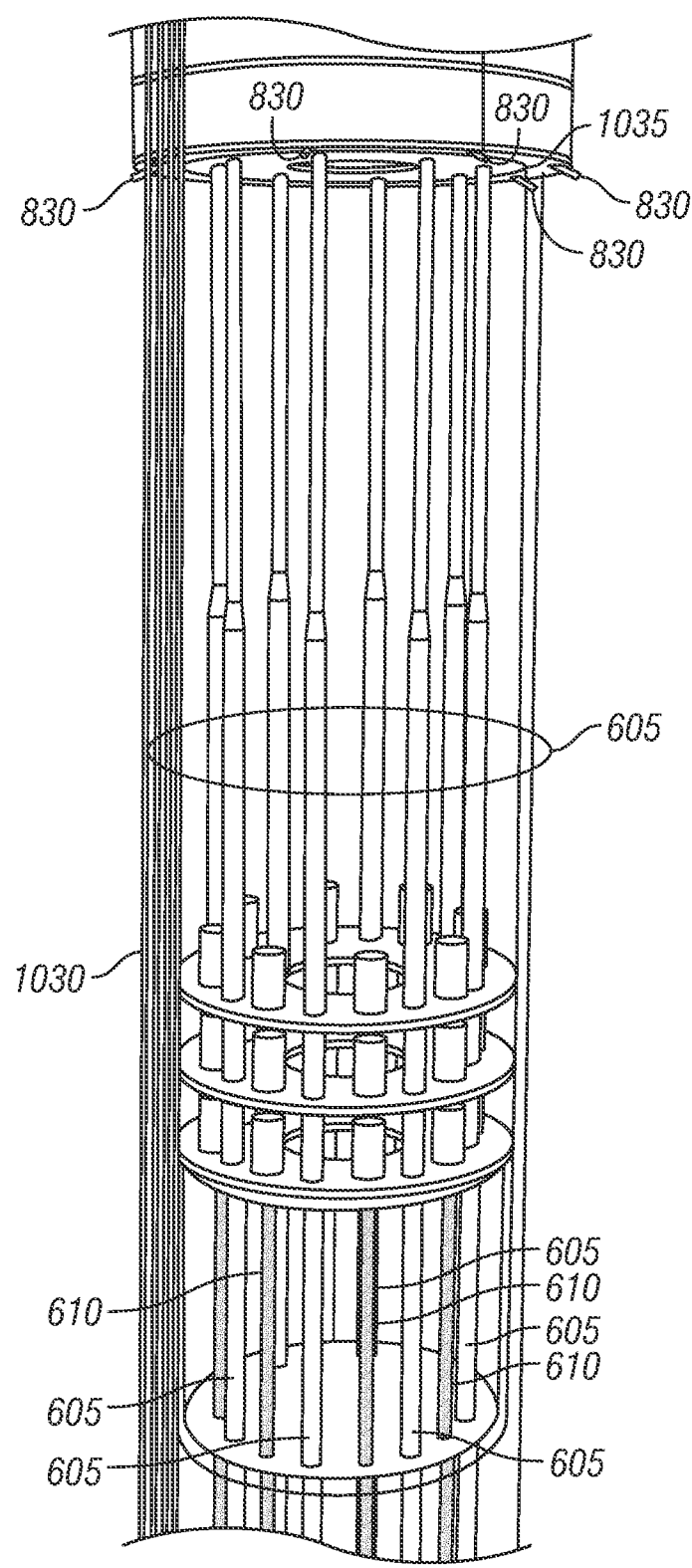
FIG. 19 depicts internalized riser pipe, compressor and buoyancy systems.

FIG. 19 provides a closer look at the riser pipe 605 sections as they ascend through the base of the spar platform hull 1630 and up through to the turbine structures' lowest deck 1035 and just below the lowest deck level 1030. These riser openings are where the vertical water flow energy meets hydroelectric turbines 820, topping out at the turbines 820, spinning the turbines 820 and then releasing water back into the sourced body of water via water return drains 830.

Shore Electric Tieback

There is a long history of laying underwater electrical transmission cables worldwide. Sometimes these projects move megawatts of power at a time and are becoming cheaper and more prevalent with the advent of offshore wind farms. Large, multiconductor cables are always being improved for longer life and better corrosion resistance. Typically, power is converted from AC to DC for transmission as it is more efficient with less loss across long distances. It is then converted back to AC at a substation on shore for distribution to the power grid.

FIGS. 14 and 15 represents a series of electric tieback cables 1030 descending from the upper deck powerhouse 1020. These cables, as shown, run down the exterior of the topside decks 1620 and spar hull 1630 run down to, and along, the floor of the accessed body of water to a terminal substation on the adjacent land. Equally, the cables may be harbored within said topside decks 1620 and spar hull 1630. These cables will be protected from hazards using a variety of methods and structures to prevent damage from such occurrences as mudslides and rockfalls on the floor of the body of water.

As presented, the full height of a representational hydroelectric system that is the present system may be approximately 3500 feet (subsea existing below 50 feet)) Yet, it should be noted that all facility drawings presented herein are representative of planned systems but will vary from final execution of a fully constructed facility. Regard must be taken for engineering and construction limitations, safety restrictions, and adjustments made necessary by the governance of the location of a facility. An illustrative example of a spar platform 600 and riser pipe 605 configuration, as shown in FIG. 16, may comprise the following:

Facility Section Details

Figure 18:
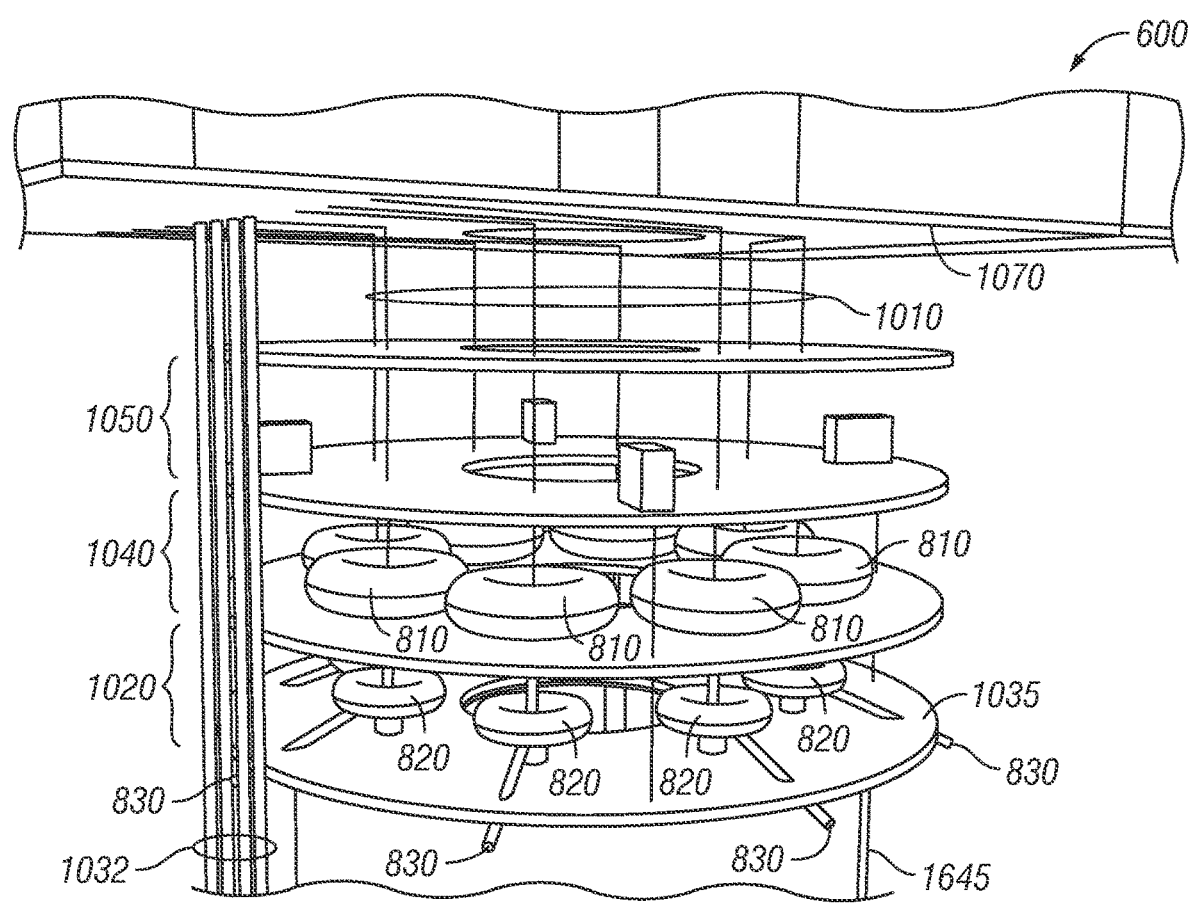
FIG. 18 illustrates an alternate view of topside decks for the present hydroelectric facility.
Figure 20:
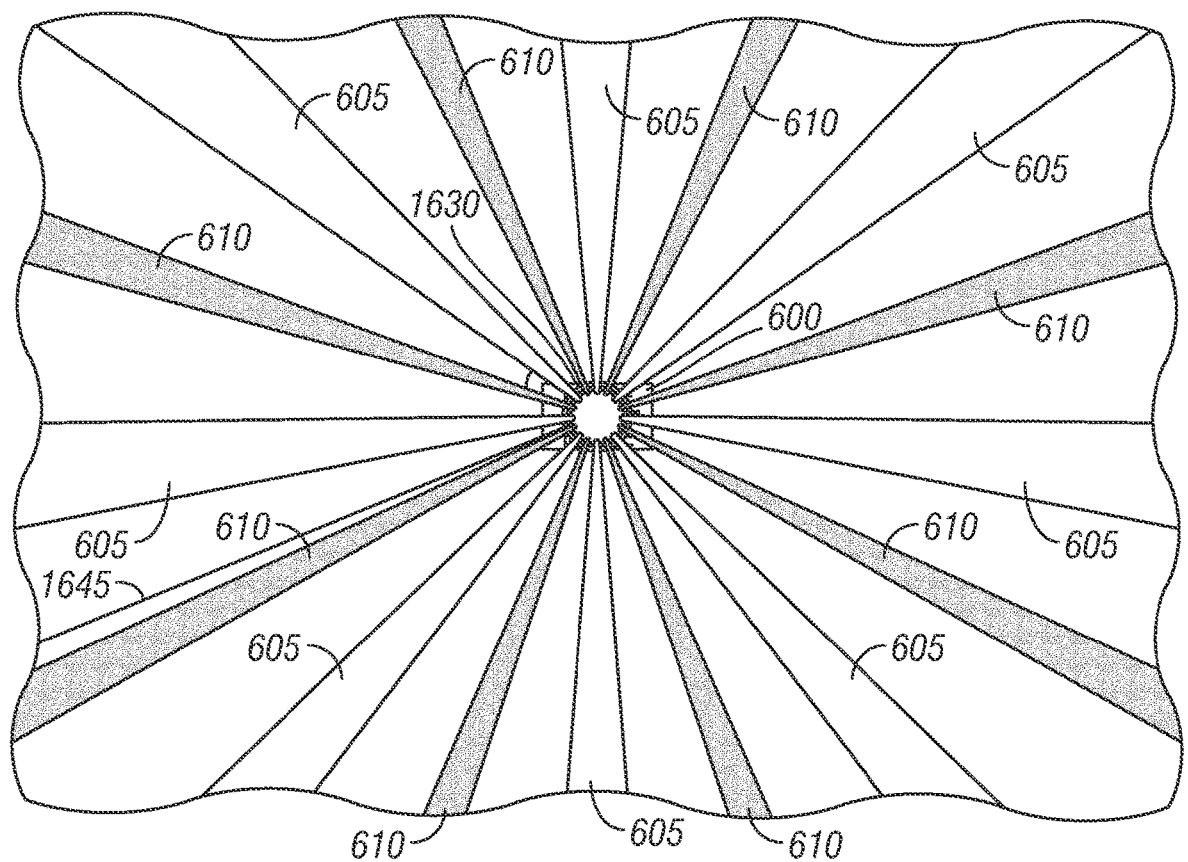
FIG. 20 is a bottom up (upward) view of the present invention.

1) Upper Deck Facilities—The upper deck facilities 1610 include:
   a. Command and control systems for controlling and monitoring all onboard systems to ensure safe and efficient production of electric power. Automated systems are used, when possible, to automate tasks such as adjusting water flow to the turbines to control the level of output to suit conditions, demand, or a combination thereof
   b. Crane 620 is utilized to facilitate the transfer of equipment and supplies from ships onto the platform, as well as lower equipment below deck to other levels as needed. The spar 600 is a hollow structure and will be designed as shown with the open hull column through the middle to access all interior space. The opening can be closed using a crane-placeable top when not in use to protect the interior from the elements.
   c. Helipad (See FIG. 6) is used for transfer of personnel and equipment to and from shore.
   d. Powerhouse (See FIG. 6) comprises electrical components needed for conversion of generated electricity to DC for transmission to shore facilities and regulation of current. This includes input circuits from the generators on a lower deck, and shore-bound tiebacks 1030 below the top deck and switching equipment necessary for bringing power inbound to the facility for startup operations as needed.
2) Topside Decks—As depicted in FIGS. 10 and 18, the topside decks 1620 include the following systems:
   a. The lowest deck level 1030 houses hydroelectric turbine 820 units. The riser pipes 605 will terminate into these units and the water will then drain back into the ocean through the outlets (water return drains 830) as seen in FIGS. 8 and 10 coming through the lowest deck floor 1035. The hydroelectric turbines 820 connect to the electric generators 810 on the next deck level 1040 by shafts 840. Notice decks have open access through the center 1055 from the top deck 1070 to the lowest deck 1035 for the use of the crane 620 to move equipment in, out, and between decks.
   b. The second deck level 1040 houses hydroelectric generators 810 and their associated electric output systems via output cabling 1010.
   c. The mooring system is integrated into subsea structures section 1640 (See FIG. 16) wherein said mooring system is comprised of mooring tethers 1645 inclusive of a variety of winches, guides, and large tethers that link to special pylons on the ocean floor. FIG. 16 represents four of these mooring units, however, large spars may have as many as a dozen or more such units depending on the environmental conditions and size of the spar.
   d. Maintenance deck—The highest empty deck level 1050 serves as a maintenance and service deck for repairing, refreshing, and storing equipment. Since the hydroelectric turbines 820 are subjected to the corrosive nature of seawater, these turbines are subject to a duty cycle and having the ability to service and redeploy them on site will be logistically and economically valuable.
3) Hull—The spar hull 1630 (FIGS. 15, 16) provides the space for the following systems:
   a. Riser pipe 605 system whereby the riser pipes 605 will pass through the spar hull section connecting the bottom of the spar platform 600 to the hydroelectric turbines 820 in the topsides decks 1620.
   b. Compressor system (consisting of air compressors 1110)—The air compression system will be housed near the base of the spar platform 600 structure to reduce air plumbing requirements. Decks (e.g., 1035, 1070) and deck levels (e.g., 1030, 1040, 1050) can be added or subtracted based on the number of compressors required for the specific facility. Depth, riser volume, and desired output can all affect this number. Associated plumbing fixtures will be included as well, including components such as cutoff valves, check valves, and pressure monitoring sensors.
   c. Buoyancy systems (ex. ballast tanks 1120) constitute the main adjustable water ballast and buoyancy system located near the base of the spar platform hull 1630 where seawater can be pumped in and out to adjust the center of gravity and stabilize the spar platform 600. Equally, there are typically included a system of permanent ballasts as well to ensure that the platform stays upright in case of a system failure or loss of mooring.
4) Subsea Structures. Subsea structures area 1640 is a complex of structures includes the following (depicted from an inferior view in FIG. 20) from near the base of the subsea structure looking upwards to the base of the spar platform hull 1630 illustrated as alternating riser pipes 605 with air pipes 610, which may also be present in a non-alternating form):
   a. Riser pipe system 1647—Riser pipes 605 descend from the spar platform 600 to the designated total depth above the sea floor. This system would likely have a number of stabilization structures associated with it to mitigate the effects of ocean currents (See specifically mooring tethers 1645 of FIGS. 15-17 and 21-22).
   b. Air plumbing system (consisting of compressed air pipes 610)—The tubing (ex. air pipes 610) for the air delivery system descending from the compressor decks in the spar platform 600 to the aeration structure near the base 1660 of the riser pipe system 1647.

c. Mooring tethers 1645 pass towards the seafloor along with the other subsea structures.

Figure 21:
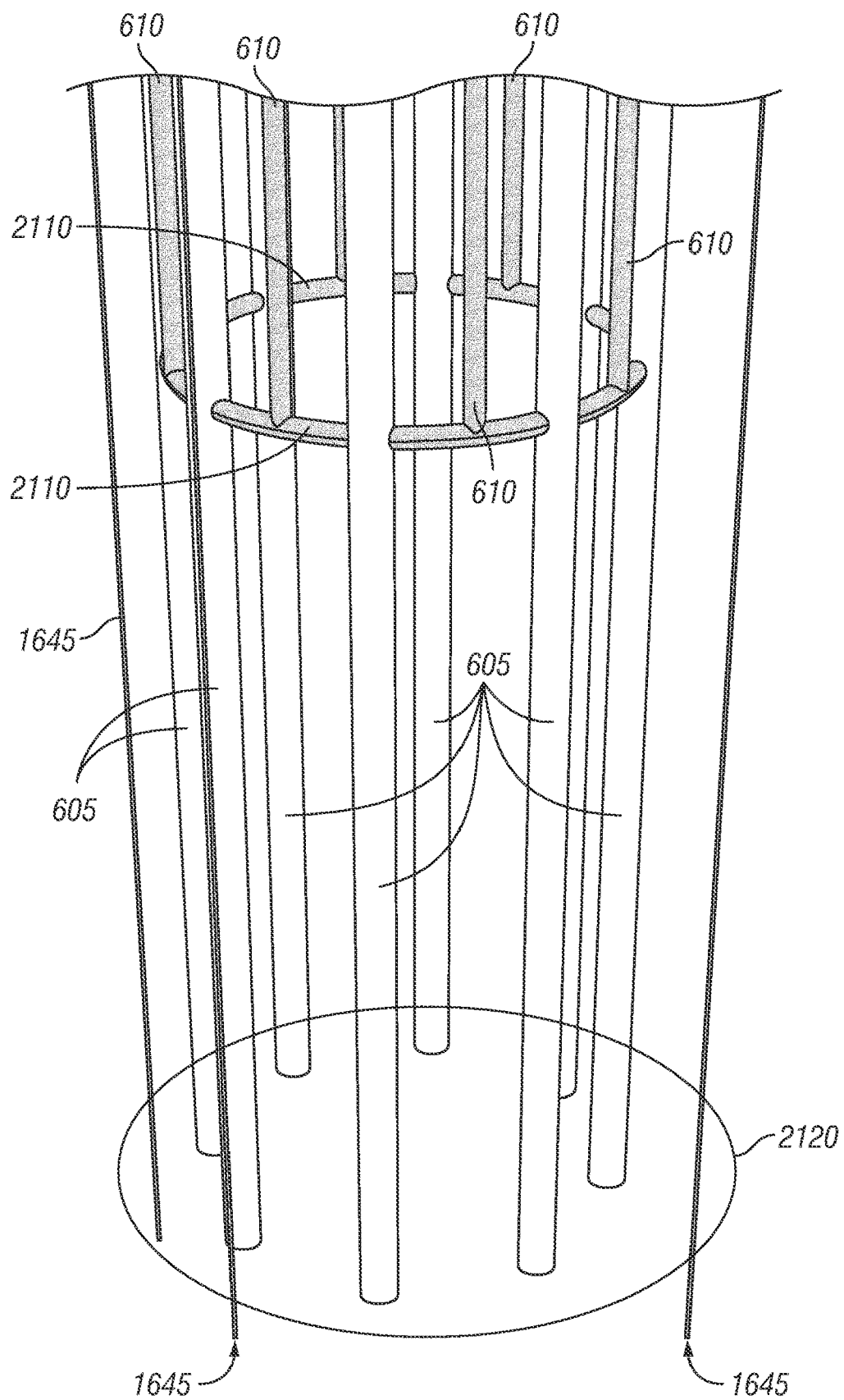
FIG. 21 shows an aeration structure at the base of the riser system.
Figure 22:
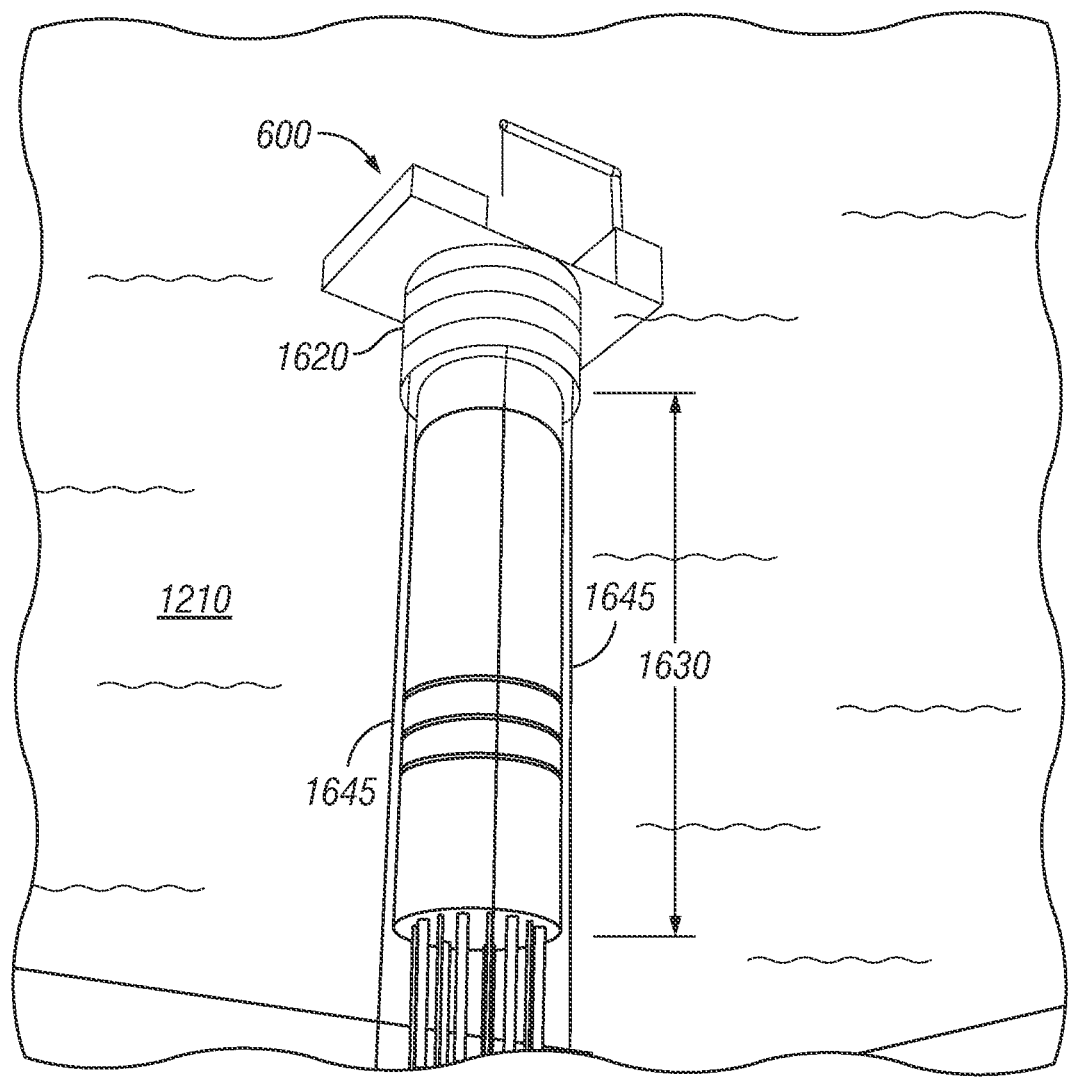
FIG. 22 is a subsea perspective view of the present system and structure.

5) Aeration Structure—FIG. 21 represents the aeration structure where the air delivery plumbing system 1650 (comprised of a plurality of compressed air pipes 610, shaded) combines with the riser pipe system 1647 (riser pipes 605) to inject the pressurized air into the water flow via the presented integrated circular air plumbing system 2110. This is where the decrease in fluid density to activate the flow process herein described would initiate. It should be noted that this is only a representation of one embodiment of a contemplated system and the actual system may be modified as to assure the maximum blending of the air and water into an effective lower density fluid, proper concentration of air in water and/or to best regulate flow. The systems included in FIG. 21 are:

a. Riser pipe system terminus 2120 represents the bottom of the riser pipe system 1647. The terminus 2120 of each riser pipe 605 will be a few hundred feet above the seafloor to prevent disruption and damage of seafloor habitat due to suction effects of the water intake. Moreover, inventor envisions an exclusion barrier (not shown) designed to prevent sea life and other debris from being drawn into the risers.

b. The lower terminus of the air plumbing system 2110, as shown in FIG. 21 is represented by a circular loop of a full aeration structure 2110 whereby pressurized air is injected (evenly distributed) into all the risers. Alternatively, air injection points may be tailored and adjustable singularly as to provide regulation of the intake of each turbine individually wherein a turbine's functional output may correspondingly be adjusted and/or regulated. Ultimately, the structure will be designed to ensure the highest degree of fluid to air blending possible to achieve a desired or optimal (1) head, (2) flow velocity, (3) volume flow rate, and (4) mass flow rate. The aeration structure is not placed at the very base of the risers as this allows adequate time for the intake flow to stabilize and reduce turbulence.

c. The mooring tethers 1645 may be seen passing outside the plumbing systems. Said mooring tethers 1645 would continue on to the seafloor for attachment to their anchor pylons.

6) Shore Electric Tieback As depicted in FIG. 15 represents shore electric tiebacks 1030 for a shore electric tieback system 1032 leaving the powerhouse module 1020 on the top deck 1620 and descending into the water 1210 below. Alternatively, these shore electric tiebacks 1030 could all be house in the interior of the spar hull for added protection. These cables would link to tie-in on the seafloor, then run to a substation or other distribution facility onshore (not shown).

The cable is laid using a specialized ship or ships whereby companies globally offer this offshore service for pipelines and utility cabling. Damage mitigation is implemented by way of specialized shielding structures to protect the cables from hazards.

Figure 23:
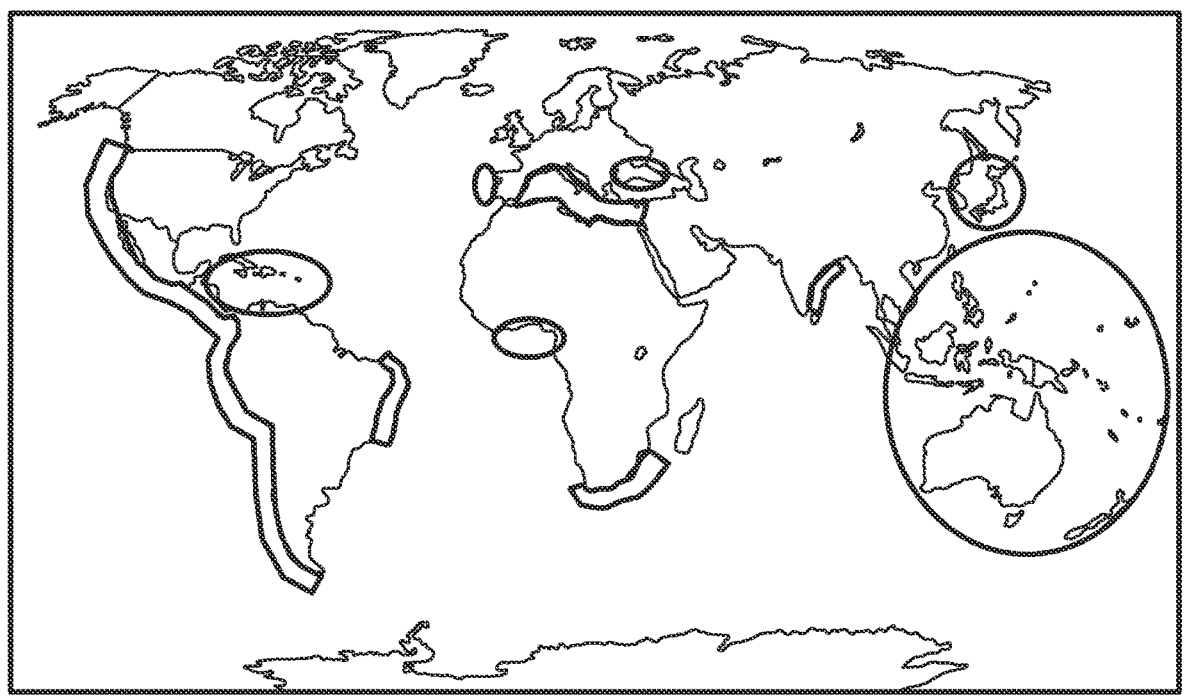
FIG. 23 represents potential facility deployment sites.

On a larger scale, FIG. 23 designates regions for potential worldwide deployment wherein the criteria making the present facility applicable includes (a) water depths of 3,000-4,500' available within 50 miles of shore, (b) existing facility positionable within reasonable transmission distance from facility to shore and (c) population density and electricity market existing on or proximate to supplied land electrical relays. These potential areas of interest include, but are not limited to, the following regions: (1) the West Coast of Canada and the United States, (2) the West Coast of Central America, (3) the West coast of North, Central, and South America, (4) Caribbean island nations, east coast of Central America, and north coast of South America, (5) the far Eastern Coast of Brazil, (6) the West coast of Portugal and Spain, (7) areas within the Mediterranean Sea, (8) Black Sea region, (9) the Southwest Coast of Africa, (10) the Southern tip of Africa (South Africa), (11) the East Coast of India, (12) Japan and Korea, (13) Many areas of Australia, New Zealand and South Pacific Island Nations and (14) many other island nations (ex. Hawaiian Islands and Taiwan).

Therefore, even with the greatly reduced density of aerated fluid in the riser pipe, the system is still able to deliver a surplus of energy to the turbine through the mass of the water flow with sufficiently increased volume flow rate and flow velocity.

While strides have been made to overcome the inadequacies of harnessing energy from water sources, it remains evident that considerable failings persist in terms of the various modes and methods of procuring said energy and the externalities created thereby. It is the goal of the present invention to remedy these shortcomings as to allow more efficient and environmentally sensitive energy procurement. It is therefore the objective of inventor to provide both qualitative and quantitative improvements in the field of hydroelectricity.

Preferred Embodiments

It is the goal of this proposed process, system and method of use to lower a "riser pipe" or riser pipes to a sufficient depth in any body of water of sufficient depth and volume, whether natural or manmade, by introducing compressed atmospheric air into the riser pipe opening contiguous with a marine depth, at a volume adequate to aerate said water, decreasing that volume's fluid density with respect to the nonaerated volume within the pipe and external fluid, thereby causing the less dense volume to ascend in the pipe and artificially raise the head elevation within the pipe beyond measured surface level (e.g., sea level or other surface elevation). Thus, necessary pressure and flow characteristics will be leveraged for creating upward flow, upward pressure, and subsequent electrical energy generation from turbine actuation either in the water flow or terminally and at the head portion of flow and fluid exodus. Once the water flow has produced rotational energy and passed the turbine, said aerated water, having released a large percentage of inserted air thereby gaining equilibrium with the water source's gaseous fluid content, utilized water is then returned and recycled back into the accessed water source. Succinctly, the pressure applied by the supplied water into the riser pipe system remains constant, albeit greater at increasing depth, while the decreasing density of the impregnated volume of "aerated water" allows for concomitant decreased density and increased (upward) flow through said riser pipe or pipes. Most appealing, both the water and air are unadulterated and unmolested and the ocean and air act as an "infinite" source of air-induced and air-facilitated hydraulic power.

As well, inventor envisions a perpetual and "symbiotic" codependence of compressed, ambient air and water wherein the electrical power supplied by said turbine or turbines may be used to operate an air pump that sequesters and compresses atmospheric air, injects that compressed air into the riser pipe at an internal location (and depth or series of depths) associated with the distal most riser pipe opening, or an appropriate depth within riser pipe(s) for flow initiation capable of inducing flow. This impregnation of aqueous source fluid with ambient air potentiates the decreased density induced vertical flow within an individual riser pipe or riser pipe(s). As provided, air may be injected at virtually any depth in a submerged riser pipe sufficient to induce (produce) flow while equally decreasing the distance required for ambient or compressed air delivery. This point may be intake or some point above intake. At the point at which sufficient aqueous fluid is aerated to initiate flow, causing denser fluid to fill that area once occupied by previously unaerated (now aerated) fluid, a lesser distance from surface zero may be employed for insertion of compressed air into the system whereby said compressed air may traverse downward some depth above the primary insertion point thereby designating a point at which air may be inserted into a column of water within a pipe that is above the initial intake (i.e., above a pipe's most terminal point). This use of a lesser depth may create efficiencies within the system after the initial aeration phase.

Concisely, using a riser pipe or plurality of riser pipes lowered to a sufficient depth in a body of water, natural or manmade, together with an initiator (compressed atmospheric air) introduced into said pipe at a requisite depth to induce flow allows for targeted air injection. Correspondingly, water density is lessened by aerating a portion or segment of the riser pipe's fluid, injecting air into an adequate volume of water to decrease the fluid's density within the pipe and artificially raising the head elevation within the pipe beyond measured surface level wherein said depth may be at some depth (1) less than the depth of the terminal pipe opening but (2) sufficient to cause decreased water density within the riser pipe, allowing less dense water to travel upward and denser marine water to flow into the pipe, replacing said less dense fluid and induce vertical flow. This is important where a lesser (shallower) depth than the depth of the terminal pipe opening of compressed air insertion may nonetheless support requisite flow (through dense marine water introduction into the terminal pipe opening moving from an area of high density to low density), while avoiding the increased power required to transport said atmospheric air the entire length of said riser pipe.

It is also within the contemplation of inventor to inject aeration at one to a plurality of locations and/or areas of a riser pipe or pipes as to facilitate and or control (increase, decrease stop and start) water flow rates taking into consideration water depth, internal and external water pressure (within and outside of the pipe contained volume), interior and exterior water mass, internal and external water viscosity, internal water velocity, aerated and nonaerated flow rates, aerated and nonaerated water ratios of air to water, water temperature and, potentially, internal and external water salinity. To this end, it is also within inventor's contemplation to utilize various sensors to monitor riser pipe depth, water pressure, water temperature, internal and external to the riser pipe, water and air density, water and air rations, water salinity, and flow rates within the riser pipe as to monitor, regulate and analyze water makeup and efficiency. Additionally, inventor may use the various sensors to monitor air to water ratios and aerated, and non-aerated, water densities, externally and internally at any point along the interior or exterior of the body of said cylinder.

It is further within the contemplation of inventor to utilize the electrical power generated by the turbine to create a small electrical field capable of removing salts and minerals from seawater. This may be accomplished through electricity-assisted, multi-stage flash distillation, multiple effect evaporation, freeze separation or reverse osmosis to facilitate or supplant conventional evaporation and condensation methods. This 'electrochemically mediated seawater desalination' is a membrane free system requiring small amounts of electrical currents to accomplish desalination. (https://www.waterworld.com/technologies/article/16207744/new-desalination-method-uses-electrical-field-to-filter-seawater#:~:text=By %20creating%20a %20small%20electrical, from %20water%20at%20a%20microscale.) Yet, inventor is not immediately opposed to any membraned, membraneless, distillation, osmosis, thermal applications, or a combination thereof, that make otherwise non-potable water suitable for human consumption, industrial use, animal husbandry and irrigation purposes.

Ultimately, necessary pressure and flow characteristics of water and air are exploited to create electrical energy from a turbine actuated by water flow. Once the water flow has transferred its energy and passed the turbine, it is then recycled back into the sourced water. The pressure applied by the sourced water to the riser pipe system has the ability to remain constant or may be variable based on need and requirements of energy production, compressed air is cycled through the riser pipe and the sourced water acts as a practically "infinite" source of water and power.

Through experimentation, the four necessary fluid flow properties required for producing hydroelectric power were deemed to hold true for the present invention. That is to say, adequate (1) Head Elevation was attained in the proposed process, sufficient (2) Flow Velocity was maintained (while still maintaining adequate volumetric flow rate and mass flow rate), (3) Volume Flow Rate (VFR) approximating Volume Flow Rates attained in traditional hydroelectric power stations), and (4) Mass Flow Rate (MFR), even with greatly reduced density of the fluid in the riser pipe, is still attainable to deliver a surplus of energy to the turbine through the mass of the water flow.

Thus, it can be concluded that using the parameters in the model executed herewith that the proposed process physically meets the needs of delivering power necessary to generate utility grade hydroelectricity through turbine rotation induction and maintained rotation. When compared to known high-performance hydroelectric power stations utilizing similar technologies and components, the proposed process performs comparably to traditional hydroelectric power station parameters and harbors innovations and advancements far in excess of those disclosed by the prior art.

A detailed description of the preferred embodiments of the invention is disclosed and described above. Yet, each and every possible feature, within the limits of the specification, are not disclosed as various permutations are postulated to be in the purview and contemplation of those having skill in the art. It is therefore possible for those having skill in the art to practice the disclosed invention while observing that certain placement and spatial arrangements are relative and capable of being arranged and rearranged at various points about the present invention that nonetheless accomplishes the correction of one or more of the infirmities as outlined and discussed above. Patently, the size and shape of certain features may be expanded or narrowed to accommodate each individual space and system requirement.

Inventors have set forth the best mode or modes contemplated of carrying out the invention known to inventor such to enable a person skilled in the art to practice the present invention, the preferred embodiments are, however, not intended to be limiting, but, on the contrary, are included in a non-limiting sense apt to alterations and modifications within the scope and spirit of the disclosure and appended claims.

Equally, it should be observed that the present invention can be understood, in terms of both structure and function, from the accompanying disclosure taken in context with the associated drawings. And whereas the present invention and method of use are capable of several different embodiments, which can be arranged and rearranged into several configurations, which allows for mixing and matching of features and components, each may exhibit accompanying interchangeable functionalities, which may be space and requirement specific, without departing from the scope and spirit of the present application as shown and described.

In one preferred embodiment, the present invention consists of a means of aerating an area and volume of marine water from a depth through an extended cylindrical pipe wherein said area and volume is aerated to achieve an artificial low density sufficient to induce upward, ascending flow.

In one preferred embodiment, the present invention consists of a means of aerating an area and volume of marine water from a depth through an extended cylindrical pipe wherein said area and volume is aerated to achieve an artificially low density sufficient to induce upward, ascending flow and supplying sufficient force to operate a turbine.

In another embodiment, the present invention consists of a means of aerating an area and volume of marine water from a depth through an extended cylindrical pipe wherein said area and volume is aerated to achieve an artificial low density sufficient to induce upward, ascending flow and supplying sufficient force to operate a turbine for electrical power generation.

In another embodiment, the present invention consists of a means of aerating an area and volume of marine water from a depth through an extended cylindrical pipe wherein said area and volume is aerated to achieve an artificial low density sufficient to induce upward, ascending flow and supplying sufficient force to operate a turbine for electrical power generation wherein said volume of water is returned to said marine water.

In another preferred embodiment, the present invention consists of a means of aerating an area and volume of marine water from a depth through an extended cylindrical pipe wherein said area and volume is aerated to achieve an artificial low density sufficient to induce upward, ascending flow and supplying sufficient force to operate a turbine for electrical power generation whereby said electrical power generation is sufficient to operate an air compressor for marine water aeration.

In yet another embodiment, the above method of marine water aeration, via insertion of compressed air, whereby air is inserted at the most terminal portion of said cylindrical pipe.

Yet another preferred embodiment, the above method of marine water aeration, via insertion of compressed air, whereby air is inserted at the most terminal portion of said cylindrical pipe whereby compressed air may also be introduced at a depth above the terminus of said cylindrical pipe as to control density throughout a riser pipe.

In one other embodiment, the above method of marine water aeration, via insertion of compressed air, whereby air is inserted at a depth above the terminus of said cylindrical pipe sufficient to induce upward, ascending flow in the cylindrical pipe.

In another embodiment, the above method of marine water aeration, via insertion of compressed air, whereby air is inserted at a depth or plurality of depths at or above the terminus of said cylindrical pipe sufficient to induce upward, assisting ascending flow in the cylindrical pipe while also controlling density and air content within said cylindrical pipe.

In another embodiment, the said marine water aeration, via insertion of compressed air, whereby air is inserted at a depth or plurality of depths at or above the terminus of said cylindrical pipe sufficient to induce upward, assisting ascending flow in the cylindrical pipe or insertion of compressed air, whereby air is inserted at or within the vicinity of the terminus in order to adjust the velocity of ascending water.

In yet another embodiment, the above method of marine water aeration, via insertion of compressed air, whereby air is inserted at a depth or plurality of depths at or above the terminus of said cylindrical pipe sufficient to induce upward, assisting ascending flow in the cylindrical pipe.

In yet another embodiment, wherein upward, assisting ascending flow in the cylindrical pipe may be monitored by sensors and air content may be controlled at various points within said cylindrical pipe.

In yet another embodiment, wherein upward, ascending flow in the cylindrical pipe may be monitored by sensors testing for internal and external temperatures, internal and external pressures within and around said cylindrical pipe and/or flow rates within said cylindrical pipe.

In another embodiment, electrical power generated from turbines bay be utilized to operate desalination equipment which removes salt from seawater and creates potable water and water suitable for agricultural irrigation. The particular embodiments disclosed above are illustrative only, as the application may be modified and practiced in different but equivalent manners apparent to those skilled in the art having the benefit of the teachings herein. It is therefore evident that the particular embodiments disclosed above may be expounded upon, and all such amendments and variations are considered within the scope and spirit of the application. Accordingly, the protection sought herein is as set forth in the description. It is apparent that an apparatus, method and system with significant advantages has been described and illustrated. Although the present application is shown in a limited number of forms, it is not limited to just these forms, but is amenable to various changes and modifications without departing from the spirit thereof.

An embodiment of said hydroelectric facility wherein said facility may receive exogeneous energy (in the form of electricity) to initiate the aforementioned process of inducement of vertical flow in a column of water which may then be maintained or terminated upon facility start-up.

Another embodiment wherein said facility may supply power to onshore consumers, to the production facility itself (for operational requirements of the facility) or a combination thereof.

In another embodiment the present facility may supply to on shore consumers and, as well, supply electricity to compressors, desalination equipment, lighting and electrical needs of said facility and the like or a combination thereof.

Another embodiment wherein the facility utilizes a spar platform or semi-submersible platform to form a "floating hydroelectric power station" harnessing high-pressure subsea conditions necessary to induce proper flow characteristics for hydroelectric power generation for inciting vertical water flow using manufactured density change from injected atmospheric air where Pelton style turbines will be turned by induced water flow to generate utility grade electrical power.

In yet another embodiment, the present facility may supply to on shore consumers and, as well, supply electricity to compressors, desalination equipment, lighting and electrical needs of said facility and the like by way of a utility grade battery storage system recharged by onboard power generation.

I claim:

1. A hydroelectric production facility comprising:
an offshore spar platform;
said spar platform placed in a body of water of sufficient depth and distance from a land mass;
said platform comprising, from above surface to subsurface, an upper deck, topside decks, a spar hull and subsea structures;
   said upper deck comprising command and control systems, cranes, helipads and powerhouse;
   said topside deck, inferior to said upper deck, comprising a maintenance deck, a generator deck, a turbine deck and a mooring system;
   said generator deck exhibiting electric generators;
   said electric generators receiving rotational-induced force from hydroelectric turbines to create electric current;
   said hydroelectric turbines receiving rotational force inducing flow from aerated water;
   said water aerated by induction of compressed air;
said spar hull, inferior to said topside deck, comprising one to a plurality of riser pipes, one to plurality of air compressors and one to a plurality of ballast tanks;
said subsea structures, descending from the base of said spar hull, comprising a riser pipe system, an air plumbing system and a mooring system;
   said riser pipe system comprised of one to plurality of riser pipes;
   said air plumbing system comprised of one to a plurality of air pipes;
   said one to plurality of riser pipes and said one to a plurality of air pipes descending to an area above said body of water's floor to a terminus;
   said mooring system comprising one to a plurality of anchoring moors descending to said body of water's floor;
   said one to a plurality of air pipes supplying compressed air to said riser pipes at some point below said spar hull base and above said one to a plurality of riser pipe termini.

2. The hydroelectric production facility of claim 1 wherein said facility is approximately 400 feet tall and extends to approximately 3500 feet in water depth.

3. The hydroelectric production facility of claim 1 wherein said upper deck may have a crane, helipad, a powerhouse or a combination thereof.

4. The hydroelectric production facility of claim 1 wherein said upper deck, topside decks, a spar hull exhibit a hollow core for delivering and retrieving functional components.

5. The hydroelectric production facility of claim 1 wherein said riser pipe system and air plumbing system are capable of inducing vertical flow, upward, within an extended-length water column by inducing changes in density in a volume of water to create an electric current, comprising:
   lowering said one to a plurality of pipes, affixed to an offshore platform, into a marine body of water to a sufficient depth, vertically;
   injecting compressed atmospheric air into said distal portion of said pipe residing at said sufficient depth;
   causing density within aerated column of water to decrease;
   causing flow of said column of water to move upward, creating ascending water flow;
   utilizing flow necessary to induce pressure;
   causing said flow and pressure to create force;
   introducing said force to said turbine;
   inducing rotational force in said turbine, creating radial force;
   transferring said radial force into said electric generator; and
   creating electric energy thereby.

6. The hydroelectric production facility of claim 5 wherein said compressed air may be injected a said riser pipe's terminus, at a location above said terminus but below said hull, at various locations along the riser pipe, or a combination thereof.

7. The hydroelectric production facility of claim 6 wherein said compressed air may be increased or decreased per singular riser pipe as to regulate water flow.

8. The hydroelectric production facility of claim 7 wherein said water may be salt water, fresh water or a combination thereof.

9. The hydroelectric production facility of claim 8 wherein said turbines are impulse, reaction, radial flow, axial flow, mixed flow, low to high flow.

10. The hydroelectric production facility of claim 9 wherein said generators are capable of rotation speeds capable of operating on different frequencies, typically 50 to 60 hertz.

11. The hydroelectric production facility of claim 10 wherein said air compressors are capable of delivering compressed air to subsea, high-pressure environments.

12. The hydroelectric production facility of claim 1 wherein said mooring system is attached to the floor of a body of water via anchor pylons.

13. The hydroelectric production facility of claim 11 wherein said air plumbing system may exhibit injection points uniformly to each of a plurality of riser pipes or individually to each designated riser pipe for homogenized comingling of air and water for maximum flow fluidity.

14. The hydroelectric production facility of claim 1 wherein said electric power generated in said electric generators is transmitted to said powerhouse, via power circuitry, and for distribution form said powerhouse, via tieback cables, to an onshore facility for distribution to consumers.

15. The hydroelectric production facility of claim 14 wherein said tieback cables feed into large subsea multiconductor electrical transmission cables for transmission to shore.

16. The hydroelectric production facility of claim 14 wherein said powerhouse converts electrical power to direct current (DC) for transmission and alternating current (AC) at an onshore substation for distribution to the power grid.

17. The hydroelectric production facility of claim 15 wherein said tieback cables may be exterior to said topside deck and spar hull or interior to topside deck and spar hull.

18. The hydroelectric production facility of claim 1 wherein said spar platform may incorporate a battery to a plurality of batteries for initiation and maintenance of flow induction, sensors at various locations and depths to monitor depth, pressure, temperature, internal and external to the riser pipe, and flow rates within the riser pipe, or a combination thereof.

* * * * *